(12) United States Patent
Hou et al.

(10) Patent No.: US 10,834,670 B2
(45) Date of Patent: Nov. 10, 2020

(54) METHOD FOR NEGOTIATING TARGET WAKE TIME, ACCESS POINT, AND STATION

(71) Applicant: Huawei Technologies Co., Ltd., Shenzhen (CN)

(72) Inventors: Keda Hou, Chengdu (CN); Jian Yu, Shenzhen (CN); Yong Wang, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 94 days.

(21) Appl. No.: 16/041,580

(22) Filed: Jul. 20, 2018

(65) Prior Publication Data
US 2018/0332534 A1 Nov. 15, 2018

Related U.S. Application Data

(63) Continuation of application No. PCT/CN2016/109457, filed on Dec. 12, 2016.

(30) Foreign Application Priority Data

Jan. 22, 2016 (CN) .......................... 2016 1 0042227

(51) Int. Cl.
*H04W 52/02* (2009.01)
*H04W 72/04* (2009.01)
*H04W 84/12* (2009.01)

(52) U.S. Cl.
CPC ....... *H04W 52/0216* (2013.01); *H04W 52/02* (2013.01); *H04W 52/0229* (2013.01);
(Continued)

(58) Field of Classification Search
CPC ............. H04W 52/02; H04W 52/0216; H04W 52/0229; H04W 72/0446; H04W 84/12; Y02D 70/00
See application file for complete search history.

(56) References Cited

U.S. PATENT DOCUMENTS

| 2014/0092797 A1 | 4/2014 | Chu et al. |
| 2014/0098724 A1 | 4/2014 | Park et al. |

(Continued)

FOREIGN PATENT DOCUMENTS

| CN | 105165074 A | 12/2015 |
| WO | 2013/106758 A1 | 7/2013 |

(Continued)

OTHER PUBLICATIONS

IEEE Std 802.11ac™—2013, Part 11: Wireless LAN Medium Access Control (MAC) and Physical Layer (PHY) Specifications; Amendment 4: Enhancements for Very High Throughput for Operation in Bands below 6 GHz, Dec. 11, 2013, 425 pages.

(Continued)

*Primary Examiner* — Kent Krueger
(74) *Attorney, Agent, or Firm* — Womble Bond Dickinson (US) LLP

(57) ABSTRACT

This application provides a method including: generating, by an access point (AP), a plurality of first media access control MAC frames, where the plurality of first MAC frames are corresponding to a plurality of stations (STAs) in a one-to-one manner, and each of the plurality of first MAC frames carries a target wake time (TWT) parameter of a corresponding STA or instruction information for instructing a corresponding STA to send a TWT parameter to the AP; and sending, by the AP, a corresponding first MAC frame to each of the plurality of STAs simultaneously, where the first MAC frame is used to determine a TWT parameter with a STA corresponding to the first MAC frame. According to embodiments of this application, the AP can simultaneously negotiate with the plurality of STAs a TWT parameter of each STA by sending the corresponding first MAC frame to each of the plurality of STAs simultaneously.

8 Claims, 10 Drawing Sheets

(52) U.S. Cl.
CPC ........ *H04W 72/0446* (2013.01); *H04W 84/12* (2013.01); *Y02D 70/00* (2018.01)

(56) References Cited

U.S. PATENT DOCUMENTS

| | | | |
|---|---|---|---|
| 2014/0211678 A1 | 7/2014 | Jafarian et al. | |
| 2018/0132175 A1* | 5/2018 | Choi | H04W 52/02 |
| 2018/0302930 A1* | 10/2018 | Wang | H04W 48/16 |

FOREIGN PATENT DOCUMENTS

| | | |
|---|---|---|
| WO | 2015/031466 A1 | 3/2015 |
| WO | 2015/099965 A1 | 7/2015 |

OTHER PUBLICATIONS

IEEE Std 802.11g—2003, Part 11: Wireless LAN Medium Access Control (MAC) and Physical Layer (PHY) specifications; Amendment 4: Further Higher Data Rate Extension in the 2.4 GHz Band, Jun. 12, 2003, 77 pages.

IEEE Std 802.11n—2009, Part 11: Wireless LAN Medium Access Control (MAC) and Physical Layer (PHY) specifications; Amendment 5: Enhancements for higher throughput, Oct. 29, 2009, 536 pages.

* cited by examiner

METHOD FOR NEGOTIATING TARGET WAKE TIME, ACCESS POINT, AND STATION

CROSS-REFERENCE TO RELATED APPLICATIONS

This application is a continuation of International Application No. PCT/CN2016/109457, filed on Dec. 12, 2016, which claims priority to Chinese Patent Application No. 201610042227.1, filed on Jan. 22, 2016. The disclosures of the aforementioned applications are hereby incorporated by reference in their entireties.

TECHNICAL FIELD

This application relates to the communications field, and more specifically, to a method for negotiating a target wake time, an access point, and a station in the communications field.

BACKGROUND

A long-sleeping low power device, referred to as a Z-type device, is described in Institute of Electrical and Electronics Engineers (IEEE) 802.11ah. To reduce energy consumption of Z-type devices, a target wake time (TWT) mechanism is proposed in the IEEE 802.11ah standard. An access point (AP) negotiates a target wake time service period (TWT SP) with a station (STA) by sending a management frame that carries a target wake time information element (TWT IE). The STA stays awake to communicate with the AP in this period of time, and may sleep in a time outside this period to save energy.

In IEEE 802.11ah, the AP may classify several STAs into one group, referred to as a TWT group. A TWT group assignment field in the TWT IE may be used to configure a TWT SP common to STAs in one TWT group. A STA may learn of, from a group identifier ID in the TWT group assignment field, which group the STA belongs to. In this way, STAs in this group only need to be awake in a wake time preset for the group, to receive data sent by the AP.

However, in the foregoing TWT mechanism, the AP negotiates with individual STAs, and negotiation efficiency is relatively low. In addition, the method for negotiating with a plurality of STAs by the AP is actually that the AP indicates a unified wake time, lacking flexibility.

SUMMARY

Embodiments of this application provide a method for negotiating a target wake time, an access point, and a station, to enable an AP to simultaneously negotiate TWTs with a plurality of STAs and further improve negotiation efficiency.

According to a first aspect, a method for negotiating a target wake time TWT is provided, and the method may be performed by an AP. The method may include: generating, by the AP, a plurality of first media access control MAC frames, where the plurality of first MAC frames are corresponding to a plurality of stations STA in a one-to-one manner, and each of the plurality of first MAC frames carries a target wake time TWT parameter of a corresponding STA or instruction information for instructing a corresponding STA to send a TWT parameter to the AP; and sending, by the AP, a corresponding first MAC frame to each of the plurality of STAs simultaneously, where the first MAC frame is used to determine a TWT parameter with a STA corresponding to the first MAC frame.

According to the method for negotiating a TWT in this embodiment of this application, the AP can simultaneously negotiate with the plurality of STAs a TWT parameter of each STA by sending the corresponding first MAC frame to each of the plurality of STAs simultaneously. In this way, a prior-art disadvantage that an AP can negotiate a TWT parameter with only one STA at a time can be overcome. Therefore, negotiation efficiency can be improved.

With reference to the first aspect, in a first possible implementation of the first aspect, the AP may send the corresponding first MAC frame to each of the plurality of STAs simultaneously by using at least one of an orthogonal frequency division multiple access (OFDMA) technology and a multi-user multiple-input multiple-output (MU-MIMO) technology.

With reference to the foregoing possible implementation of the first aspect, in a second possible implementation of the first aspect, each of the plurality of first MAC frames may carry trigger information of the corresponding STA, and the trigger information may include resource scheduling information for uplink transmission of the corresponding STA. In this case, the method may further include: receiving, by the AP, acknowledgment information sent by some or all of the plurality of STAs based on corresponding trigger information when the some or all of the first STAs determine TWT parameters carried in corresponding first MAC frames, and/or receiving, by the AP, second MAC frames sent by some or all of the plurality of STAs based on corresponding trigger information and instruction information that is carried in corresponding first MAC frames, where the second MAC frame carries a TWT parameter determined by a corresponding STA.

With reference to the foregoing possible implementation of the first aspect, in a third possible implementation of the first aspect, the method may further include: sending, by the AP, trigger information to first STAs in the plurality of STAs, where the trigger information includes resource scheduling information for uplink transmission of each of the first STAs; and receiving, by the AP, acknowledgment information sent by some or all of the first STAs based on the trigger information when the some or all of the first STAs determine TWT parameters carried in corresponding first MAC frames, and/or receiving, by the AP, second MAC frames sent by some or all of the first STAs based on the trigger information and instruction information that is carried in corresponding first MAC frames, where the second MAC frame carries a TWT parameter determined by a corresponding STA.

With reference to the foregoing possible implementation of the first aspect, in a fourth possible implementation of the first aspect, when sending the trigger information to the first STAs in the plurality of STAs, the AP may send trigger information of corresponding STAs in the first STAs by sending corresponding aggregate MAC protocol data units to the first STAs, where the aggregate MAC protocol data unit includes a first MAC frame and a trigger frame of a corresponding STA, and the trigger frame carries trigger information of the corresponding STA.

According to a second aspect, a method for negotiating a target wake time TWT is provided, and the method may be performed by an AP. The method may include: sending, by an access point AP, trigger information to a plurality of STAs, where the trigger information is used to instruct each of some or all of the plurality of STAs to send a first media access control MAC frame corresponding to the STA to the AP; and receiving, by the AP, the first MAC frame sent by each of the some or all of the plurality of STAs based on the trigger information, where the first MAC frame carries a target wake time TWT parameter of the corresponding STA or instruction information for instructing the AP to send a TWT parameter to the corresponding STA, the TWT parameter is used to negotiate a TWT of the corresponding STA, and the instruction information is used to instruct the AP to send, to the corresponding STA, a second MAC frame that carries the TWT parameter of the corresponding STA.

According to the method for negotiating a TWT in this embodiment of this application, the plurality of STAs are triggered by the AP to proactively and simultaneously initiate TWT negotiation. In this way, the AP can simultaneously negotiate TWTs with the plurality of STAs, so that a prior-art disadvantage that an AP can negotiate a TWT parameter with only one STA at a time can be overcome. Therefore, negotiation efficiency can be improved.

With reference to the second aspect, in a first possible implementation of the second aspect, the AP may receive the first MAC frames sent by the some or all of the plurality of STAs based on the trigger information by using at least one of an orthogonal frequency division multiple access OFDMA technology and a multi-user multiple-input multiple-output MU-MIMO technology.

With reference to the foregoing possible implementation of the second aspect, in a second possible implementation of the second aspect, the method may further include: sending, by the AP, acknowledgment information to the corresponding STA based on the TWT parameter of the STA carried in the first MAC frame, or sending, by the AP, the second MAC frame to the corresponding STA based on the instruction information carried in the first MAC frame.

According to a third aspect, a method for negotiating a target wake time TWT is provided, and the method may be performed by an AP. The method may include: generating, by an access point AP, a first media access control MAC frame, where the first MAC frame carries a plurality of pieces of target wake time TWT information that are corresponding to first STAs in a plurality of STAs in a one-to-one manner; and sending, by the AP, the first MAC frame to the plurality of STAs, where the first MAC frame is used for each of the first STAs to determine a TWT parameter of the STA based on corresponding TWT information.

According to the method for negotiating a TWT in this embodiment of this application, the AP can simultaneously negotiate TWTs with some or all of the plurality of STAs by sending, to the plurality of STAs, TWT information of the some or all of the plurality of STAs, so that a prior-art disadvantage that an AP can negotiate a TWT parameter with only one STA at a time can be overcome. Therefore, negotiation efficiency can be improved.

With reference to the third aspect, in a first possible implementation of the third aspect, the generating, by an access point AP, a first media access control MAC frame includes: generating, by the AP, the first MAC frame by aggregating a plurality of MAC frames that are corresponding to the first STAs in a one-to-one manner.

With reference to the foregoing possible implementation of the third aspect, in a second possible implementation of the third aspect, the generating, by an access point AP, a first media access control MAC frame includes: generating, by the AP, the first MAC frame by generating a first information element that carries the plurality of pieces of TWT information, where the first information element includes a plurality of first fields and a plurality of second fields, each first field defines a unique identifier ID corresponding to an $i^{th}$ STA in the first STAs, and each second field defines TWT information corresponding to the $i^{th}$ STA.

With reference to the foregoing possible implementation of the third aspect, in a third possible implementation of the third aspect, the generating, by an access point AP, a first media access control MAC frame includes: generating, by the AP, the first MAC frame by generating a trigger frame that carries the plurality of pieces of TWT information, where the trigger frame includes a plurality of third fields, fourth fields, and fifth fields, each third field defines a unique identifier ID corresponding to an $i^{th}$ STA in the first STAs, each fourth field defines resource scheduling information corresponding to the $i^{th}$ STA in the first STAs, and each fifth field defines TWT information corresponding to the $i^{th}$ STA in the first STAs.

With reference to the foregoing possible implementation of the third aspect, in a fourth possible implementation of the third aspect, the generating, by an access point AP, a first media access control MAC frame includes: generating, by the AP, the first MAC frame by generating a second information element that carries the plurality of pieces of TWT information, where the second information element includes a plurality of sixth fields, and each sixth field defines TWT information corresponding to an $i^{th}$ STA in the first STAs; and the MAC frame further includes a plurality of seventh fields and a plurality of eighth fields, where each seventh field defines a unique identifier ID corresponding to the $i^{th}$ STA in the first STAs, and each eighth field defines resource scheduling information corresponding to the $i^{th}$ STA in the first STAs.

With reference to the foregoing possible implementation of the third aspect, in a fifth possible implementation of the third aspect, an ordinal position of an $i^{th}$ seventh field is corresponding to an ordinal position of a sixth field that is in the second information element and that defines TWT information of a STA corresponding to the $i^{th}$ seventh field.

With reference to the foregoing possible implementation of the third aspect, in a sixth possible implementation of the third aspect, the method may further include: sending, by the AP, trigger information to the first STAs, where the trigger information includes resource scheduling information for uplink transmission of each of the first STAs.

With reference to the foregoing possible implementations of the third aspect, in a seventh possible implementation of the third aspect, the TWT information may include a TWT parameter of a corresponding STA. In this case, the method further includes: receiving, by the AP, acknowledgment information sent by some or all of the first STAs based on the trigger information when the some or all of the first STAs determine corresponding TWT parameters carried in the first MAC frame.

With reference to the foregoing possible implementations of the third aspect, in an eighth possible implementation of the third aspect, the TWT information may include instruction information for instructing the AP to send the TWT parameter to the corresponding STA. In this case, the method may further include: receiving, by the AP, second MAC frames sent by some or all of the first STAs based on the trigger information and corresponding instruction information that is carried in the first MAC frame, where TWT information carried in the second MAC frame carries a TWT parameter determined by a corresponding STA.

According to a fourth aspect, a method for negotiating a target wake time TWT is provided, and the method may be performed by a STA. The method may include: receiving, by a station STA, trigger information sent by an access point AP, where the trigger information is used to instruct the STA to send a first media access control MAC frame corresponding to the STA to the AP; and sending, by the STA, the first MAC frame to the AP based on the trigger information, where the first MAC frame carries a target wake time TWT parameter of the STA or instruction information for instructing the AP to send a TWT parameter to the STA, and the TWT parameter is used to negotiate a TWT of the STA.

In this embodiment of this application, a STA in a plurality of STAs may be triggered by the AP to negotiate a TWT with the AP. When the STA negotiates the TWT with the AP, another STA may also be triggered by the AP to negotiate a TWT with the AP. Therefore, negotiation efficiency can be improved.

With reference to the fourth aspect, in a first possible implementation of the fourth aspect, the sending, by the STA, the first MAC frame to the AP based on the trigger information may include: sending, by the STA, the first MAC frame to the AP based on the trigger information by using at least one of an orthogonal frequency division multiple access OFDMA technology and a multi-user multiple-input multiple-output MU-MIMO technology.

With reference to the foregoing possible implementation of the fourth aspect, in a second possible implementation of the fourth aspect, the method may further include: receiving, by the STA, acknowledgment information sent by the AP based on the TWT parameter of the STA carried in the first MAC frame, or receiving, by the STA, a second MAC frame that carries the TWT parameter of the STA and that is sent by the AP based on the instruction information carried in the first MAC frame.

According to a fifth aspect, an access point AP is provided, where the AP may include a generation unit and a sending unit. The generation unit may generate a plurality of first media access control MAC frames, where the plurality of first MAC frames are corresponding to a plurality of stations STAs in a one-to-one manner, and each of the plurality of first MAC frames carries a target wake time TWT parameter of a corresponding STA or instruction information for instructing a corresponding STA to send a TWT parameter; and the sending unit may send, to each of the plurality of STAs simultaneously, a corresponding first MAC frame generated by the generation unit, where the first MAC frame is used to determine a TWT parameter with a STA corresponding to the first MAC frame.

According to this embodiment of this application, the AP can simultaneously negotiate with the plurality of STAs a TWT parameter of each STA by sending the corresponding first MAC frame to each of the plurality of STAs simultaneously. In this way, a prior-art disadvantage that an AP can negotiate a TWT parameter with only one STA at a time can be overcome. Therefore, negotiation efficiency can be improved.

The access point AP according to the fifth aspect may include units configured to perform the method according to any one of the first aspect or the possible implementations of the first aspect, and may be configured to perform the method according to any one of the first aspect or the possible implementations of the first aspect.

According to a sixth aspect, an access point AP is provided, where the AP may include a sending unit and a receiving unit. The sending unit may send trigger information to a plurality of stations STAs, where the trigger information is used to instruct each of some or all of the plurality of STAs to send a first media access control MAC frame corresponding to the STA; and the receiving unit may receive the first MAC frame sent by each of the some or all of the plurality of STAs based on the trigger information sent by the sending unit, where the first MAC frame carries a target wake time TWT parameter of the corresponding STA or instruction information for instructing the AP to send a TWT parameter to the corresponding STA, the TWT parameter is used to negotiate a TWT of the corresponding STA, and the instruction information is used to instruct the AP to send, to the corresponding STA, a second MAC frame that carries the TWT parameter of the corresponding STA.

In this embodiment of this application, the plurality of STAs are triggered by the AP to proactively and simultaneously initiate TWT negotiation. In this way, the AP can simultaneously negotiate TWTs with the plurality of STAs, so that a prior-art disadvantage that an AP can negotiate a TWT parameter with only one STA at a time can be overcome. Therefore, negotiation efficiency can be improved.

The access point AP according to the sixth aspect may include units configured to perform the method according to any one of the second aspect or the possible implementations of the second aspect, and may be configured to perform the method according to any one of the second aspect or the possible implementations of the second aspect.

According to a seventh aspect, an access point AP is provided, where the AP may include a generation unit and a sending unit. The generation unit may generate a first media access control MAC frame, where the first MAC frame carries a plurality of pieces of target wake time TWT information that are corresponding to first station STAs in a plurality of STAs in a one-to-one manner; and the sending unit may send, to the plurality of STAs, the first MAC frame generated by the generation unit, where the first MAC frame is used for each of the first STAs to determine a TWT parameter of the STA based on corresponding TWT information.

In this embodiment of this application, the AP can simultaneously negotiate TWTs with some or all of the plurality of STAs by sending, to the plurality of STAs, TWT information of the some or all of the plurality of STAs, so that a prior-art disadvantage that an AP can negotiate a TWT parameter with only one STA at a time can be overcome. Therefore, negotiation efficiency can be improved.

The access point AP according to the seventh aspect may include units configured to perform the method according to any one of the third aspect or the possible implementations of the third aspect, and may be configured to perform the method according to any one of the third aspect or the possible implementations of the third aspect.

According to an eighth aspect, a station STA is provided, where the STA may include a receiving unit and a sending unit. The receiving unit may receive trigger information sent by an access point AP, where the trigger information is used to instruct the STA to send a first media access control MAC frame corresponding to the STA to the AP; and the sending unit may send the first MAC frame to the AP based on the trigger information received by the receiving unit, where the first MAC frame carries a target wake time TWT parameter of the STA or instruction information for instructing the AP to send a TWT parameter to the STA, and the TWT parameter is used to negotiate a TWT of the STA.

In this embodiment of this application, a STA in a plurality of STAs may be triggered by the AP to negotiate a TWT with the AP. When the STA negotiates the TWT with the AP, another STA may also be triggered by the AP to negotiate a TWT with the AP. Therefore, negotiation efficiency can be improved.

The station STA according to the eighth aspect may include units configured to perform the method according to any one of the fourth aspect or the possible implementations of the fourth aspect, and may be configured to perform the method according to any one of the fourth aspect or the possible implementations of the fourth aspect.

According to a ninth aspect, an access point AP is provided, including a transmitter, a receiver, a processor, a memory, and a bus system. The receiver, the transmitter, the memory, and the processor are connected by the bus system; the memory is configured to store an instruction; the processor is configured to execute the instruction stored in the memory, to control the receiver to receive a signal and control the transmitter to send a signal; and when the processor executes the instruction stored in the memory, the execution enables the processor to perform the method according to any one of the first aspect or the possible implementations of the first aspect.

According to a tenth aspect, an access point AP is provided, including a transmitter, a receiver, a processor, a memory, and a bus system. The receiver, the transmitter, the memory, and the processor are connected by the bus system; the memory is configured to store an instruction; the processor is configured to execute the instruction stored in the memory, to control the receiver to receive a signal and control the transmitter to send a signal; and when the processor executes the instruction stored in the memory, the execution enables the processor to perform the method according to any one of the second aspect or the possible implementations of the second aspect.

According to an eleventh aspect, an access point AP is provided, including a transmitter, a receiver, a processor, a memory, and a bus system. The receiver, the transmitter, the memory, and the processor are connected by the bus system; the memory is configured to store an instruction; the processor is configured to execute the instruction stored in the memory, to control the receiver to receive a signal and control the transmitter to send a signal; and when the processor executes the instruction stored in the memory, the execution enables the processor to perform the method according to any one of the third aspect or the possible implementations of the third aspect.

According to a twelfth aspect, a station (STA) is provided, including a transmitter, a receiver, a processor, a memory, and a bus system. The receiver, the transmitter, the memory, and the processor are connected by the bus system; the memory is configured to store an instruction; the processor is configured to execute the instruction stored in the memory, to control the receiver to receive a signal and control the transmitter to send a signal; and when the processor executes the instruction stored in the memory, the execution enables the processor to perform the method according to any one of the fourth aspect or the possible implementations of the fourth aspect.

According to a thirteenth aspect, a computer readable medium is provided, configured to store a computer program, where the computer program includes an instruction used to perform the method according to any one of the first aspect or the possible implementations of the first aspect.

According to a fourteenth aspect, a computer readable medium is provided, configured to store a computer program, where the computer program includes an instruction used to perform the method according to any one of the second aspect or the possible implementations of the second aspect.

According to a fifteenth aspect, a computer readable medium is provided, configured to store a computer program, where the computer program includes an instruction used to perform the method according to any one of the third aspect or the possible implementations of the third aspect.

According to a sixteenth aspect, a computer readable medium is provided, configured to store a computer program, where the computer program includes an instruction used to perform the method according to any one of the fourth aspect or the possible implementations of the fourth aspect.

DESCRIPTION OF EMBODIMENTS

The following describes the technical solutions in the embodiments of this application with reference to the accompanying drawings in the embodiments of this application.

The embodiments of this application may be applied to a wireless local area network (WLAN). Currently, standards used for a WLAN are the IEEE 802.11 series. The WLAN may include a plurality of basic service sets (BSS), and network nodes in a basic service set are STAs. STAs include access point stations (AP STA) and non access point stations (Non-AP STA). Each basic service set may include one AP and a plurality of non-AP STAs associated with the AP.

The AP is also known as a wireless access point, a hot spot, or the like. The AP is an access point for a mobile user to access a wired network, and is mainly deployed at home, or inside a building or a campus, with a coverage radius typically of tens to hundreds of meters. Certainly, the AP may alternatively be deployed outdoors. The AP is equivalent to a bridge connecting a wired network and a wireless network. Main functions of the AP are connecting wireless network clients together, and connecting the wireless network to the Ethernet. Specifically, the AP may be a terminal device or a network device provided with a Wireless Fidelity (Wi-Fi) chip. Optionally, the AP may be a device supporting the 802.11ax standard. Further, optionally, the AP may be a device supporting a plurality of WLAN standards such as 802.11ac, 802.11n, 802.11g, 802.11b, and 802.11a.

The non-AP STA may be a wireless communications chip, a wireless sensor, or a wireless communications terminal. For example, the non-AP STA is a mobile phone supporting a Wi-Fi communication function, a tablet computer supporting a Wi-Fi communication function, a set top box supporting a Wi-Fi communication function, a smart TV supporting a Wi-Fi communication function, a smart wearable device supporting a Wi-Fi communication function, an in-vehicle communications device supporting a Wi-Fi communication function, or a computer supporting a Wi-Fi communication function. Optionally, the station may support the 802.11ax standard. Further, optionally, the station supports a plurality of WLAN standards such as 802.11ac, 802.11n, 802.11g, 802.11b, and 802.11a.

Figure 1:
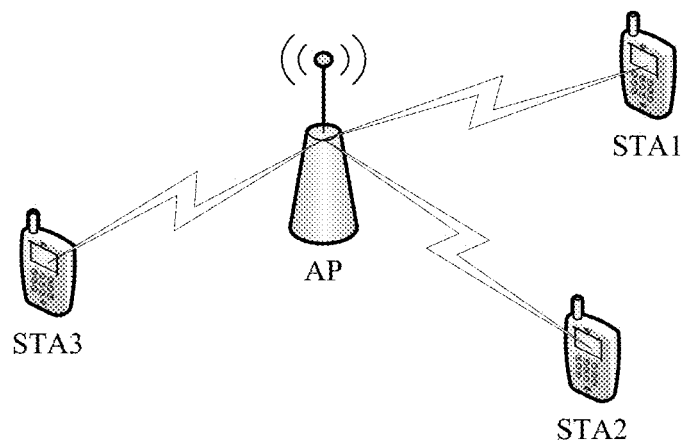
FIG. 1 is a schematic block diagram of an application scenario according to an embodiment of this application.

FIG. 1 is a schematic diagram of a system in a typical WLAN deployment scenario, including one AP and three STAs. The AP communicates with a STA1, a STA2, and a STA3 separately.

In the WLAN system 802.11ax into which an OFDMA technology is adopted, the AP may perform uplink and downlink transmission with different STAs on different time-frequency resources. The AP may perform uplink and downlink transmission in different modes, for example, a single-user multiple-input multiple-output (SU-MIMO) mode in OFDMA or a multi-user multiple-input multiple-output (MU-MIMO) mode in OFDMA.

The AP may simultaneously send downlink physical layer protocol data units (PPDU) to a plurality of stations or a plurality of station groups. Herein, the plurality of stations may be stations in the SU-MIMO mode, and the plurality of station groups may be station groups in the MU-MIMO mode.

It should be noted that, in a future possible WLAN standard, a name of the standard, a name of a field, or the like may be any substitution, and shall not be construed as a limitation on the protection scope of this application. The description of the PPDU is also applicable to all the embodiments.

Figure 2:
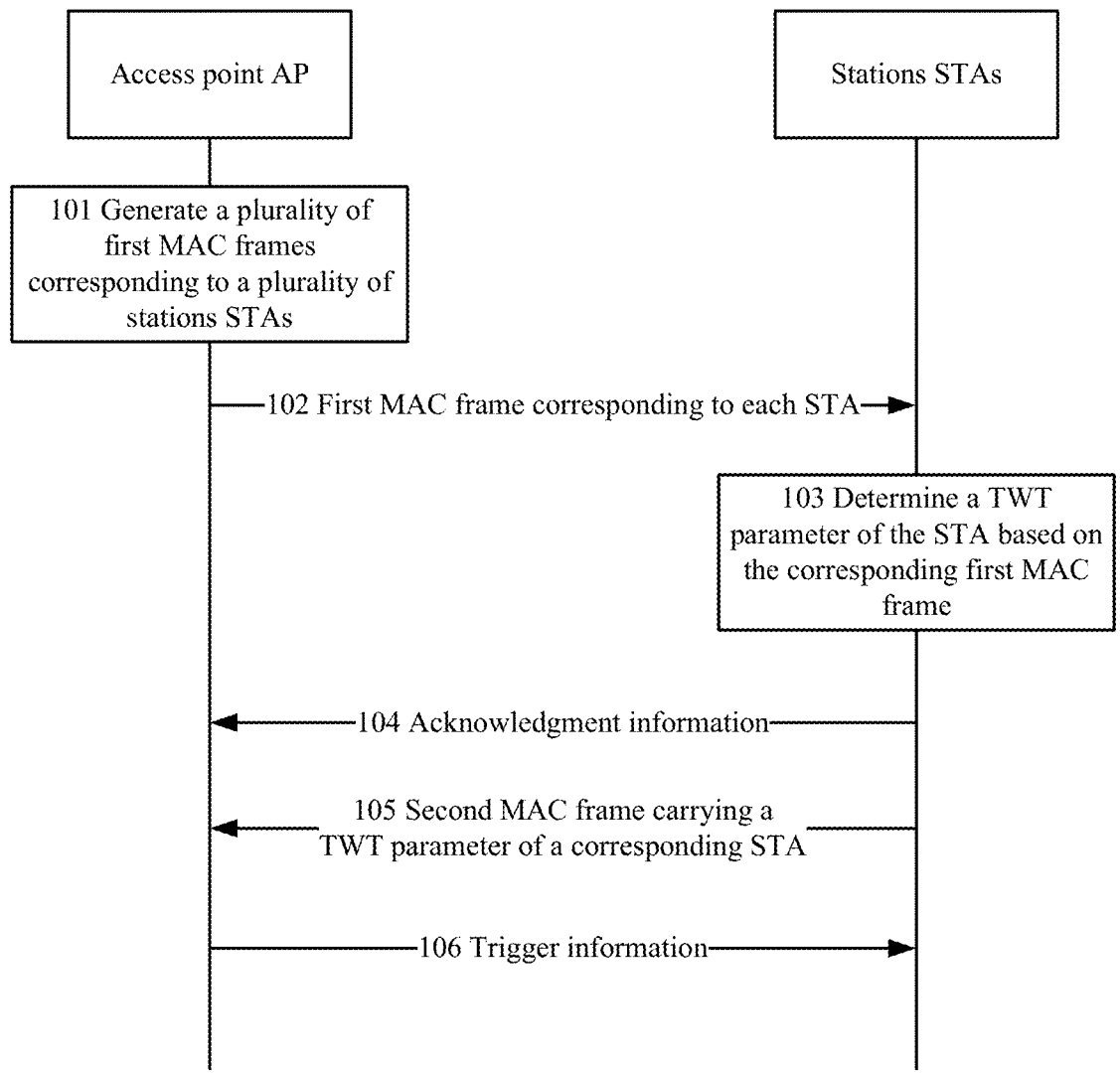
FIG. 2 is a schematic flowchart of a method for negotiating a target wake time TWT according to an embodiment of this application.

FIG. 2 is a flowchart of a method for negotiating a target wake time TWT according to an embodiment of this application. The following details the method for negotiating a target wake time TWT according to this embodiment of this application with reference to FIG. 2.

101. An AP generates a plurality of first MAC frames corresponding to a plurality of stations STAs.

The AP generates the plurality of first MAC frames, and each first MAC frame is corresponding to one STA. Each first MAC frame may carry a TWT parameter of a STA corresponding to the first MAC frame. The STA may determine a wake time based on the TWT parameter. Specifically, when the STA determines the TWT parameter, the wake time of the STA is also determined. The first MAC frame may alternatively carry instruction information, and the instruction information is used to instruct a STA corresponding to the first MAC frame to send a TWT parameter of the STA to the AP.

In other words, the AP may specify a TWT parameter of a STA, or may instruct a STA to determine a TWT parameter by itself and notify the AP of the TWT parameter.

It should be noted that the plurality of STAs in this embodiment of this application are STAs that need to perform TWT negotiation, but not all STAs in a cell.

102. The AP sends a corresponding first MAC frame to each of the plurality of STAs simultaneously.

Optionally, the AP may send the plurality of first MAC frames to the plurality of STAs by using an orthogonal frequency division multiple access OFDMA technology. Optionally, the AP may alternatively send the plurality of first MAC frames to the plurality of STAs by using a multi-user multiple-input multiple-output MU-MIMO technology. In addition, the AP may alternatively send the plurality of first MAC frames to the plurality of STAs by using both an OFDMA technology and an MU-MIMO technology. A manner of sending downlink MAC frames of multiple users by the AP is not limited in this application.

103. Each of the plurality of STAs determines a TWT parameter of the STA based on the corresponding first MAC frame.

For example, the TWT parameter determined by the STA may be a TWT parameter added by the AP to the corresponding first MAC frame. For another example, the STA may determine the TWT parameter by itself based on the instruction information carried in the first MAC frame.

According to the method for negotiating a TWT in this embodiment of this application, the AP can simultaneously negotiate with the plurality of STAs a TWT parameter of each STA by sending the corresponding first MAC frame to each of the plurality of STAs simultaneously. In this way, a prior-art disadvantage that an AP can negotiate a TWT parameter with only one STA at a time can be overcome. Therefore, negotiation efficiency can be improved.

Figure 5:
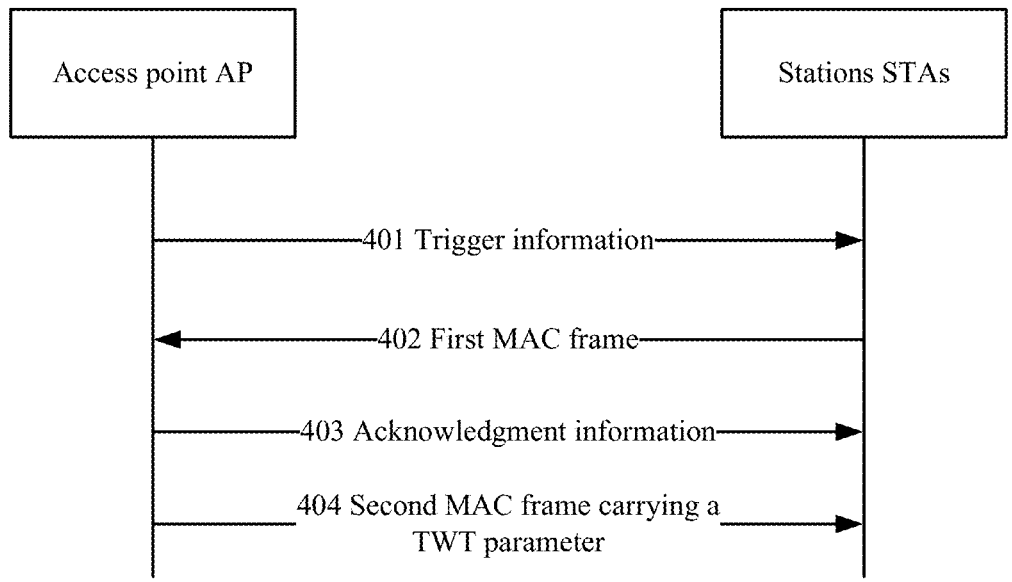
FIG. 5 is a schematic flowchart of a method for negotiating a target wake time TWT according to another embodiment of this application.
Figure 7:
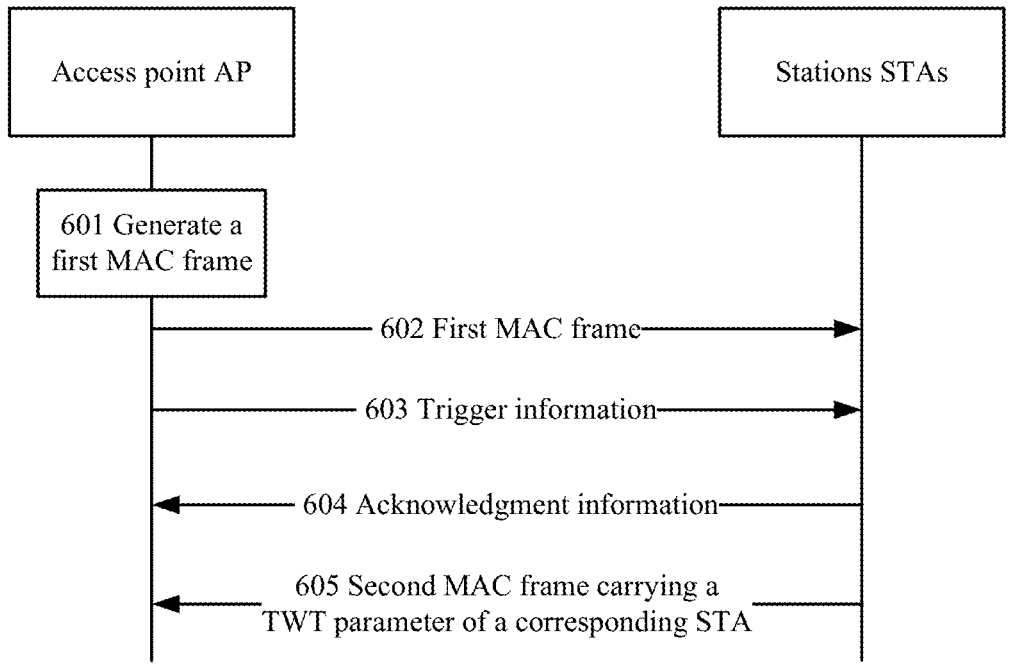
FIG. 7 is a schematic flowchart of a method for negotiating a target wake time TWT according to still another embodiment of this application.

It should be noted that, stations STAs shown in FIG. 2 represent a plurality of STAs, and information sent by the stations STAs to the AP may be information sent by some of the STAs, or may be information sent by all of the STAs. In the following descriptions, FIG. 5 and FIG. 7 are similar to FIG. 2 and further explanation is not given.

Optionally, after receiving the TWT parameter sent by the AP, the STA may not reply to the AP. In this case, the AP may consider by default that the STA has correctly received the TWT parameter, and is to stay awake in an agreed time to receive data sent by the AP.

Optionally, each of the plurality of first MAC frames may further carry trigger information of the corresponding STA, and the trigger information includes resource scheduling information for uplink transmission of the corresponding STA.

Resource scheduling information for uplink transmission of a STA may include a resource block indication used, a modulation and coding scheme required, a quantity of spatial flows, a length of a physical protocol data unit (PPDU), and the like when the STA performs multi-user uplink transmission.

Optionally, the method may further include: 104. The AP receives acknowledgment information sent by some or all of the plurality of STAs based on corresponding trigger information when the some or all of the first STAs determine TWT parameters carried in corresponding first MAC frames. The acknowledgment information may be acknowledgment (ACK) frames sent by the some or all of the plurality STAs, or may be acknowledgment information carried in a given field in data frames sent by the some or all of the plurality of STAs. A specific form of the acknowledgment information is not limited in this application.

Optionally, the method may further include: 105. The AP receives second MAC frames sent by some or all of the plurality of STAs based on corresponding trigger information and instruction information that is carried in corresponding first MAC frames, where the second MAC frame carries a TWT parameter determined by a corresponding STA.

In this embodiment of this application, a given field in the first MAC frame may be used to carry the trigger information. When receiving a TWT parameter sent by the AP, a STA may send an ACK frame to the AP on a corresponding resource block based on resource scheduling information of the STA. This indicates that the STA has successfully received a first MAC frame corresponding to the STA and accepts the TWT parameter indicated by the AP.

When receiving instruction information sent by the AP, the STA may determine a TWT parameter by itself, and send, to the AP, a second MAC frame that carries the TWT parameter. After receiving the second MAC frame, the AP may learn of the TWT parameter determined by the STA. In this case, the AP may not reply to the STA to acknowledge by default that the TWT parameter has been correctly received, and may send data to the STA as agreed. Alternatively, the AP may send an ACK frame to the corresponding STA. In addition, if the AP does not accept the TWT parameter determined by the STA, the AP may send a negative acknowledgment (NACK) response to the corresponding STA. Then, a next round of negotiation may be performed.

Optionally, the method may further include: 106. The AP sends trigger information to first STAs in the plurality of STAs, where the trigger information includes resource scheduling information for uplink transmission of each of the first STAs. In this case, the AP may receive ACK frames sent by some or all of the first STAs based on the trigger information when the some or all of the first STAs determine TWT parameters carried in corresponding first MAC frames. The AP may alternatively receive second MAC frames sent by some or all of the first STAs based on the trigger information and instruction information that is carried in corresponding first MAC frames, where the second MAC frame carries a TWT parameter determined by a corresponding STA.

When sending the trigger information to the STA, the AP may separately send a trigger frame after sending the first MAC frame. The trigger frame carries the trigger information. The AP may alternatively aggregate and send a first MAC frame and a trigger frame together by using an aggregate MAC protocol data unit (A-MPDU), where the trigger frame carries the trigger information. A manner of sending the trigger information by the AP is not limited in this application.

The first STAs may be the plurality of STAs or some of the plurality of STAs. That is, the AP may send trigger information to the plurality of STAs, or may send trigger information to some of the plurality of STAs. Specifically, after receiving the corresponding first MAC frame sent by the AP, each of the plurality of STAs may make a reply based on respective trigger information. To be specific, the STA replies with an ACK frame or a second MAC frame based on information carried in the first MAC frame. Alternatively, a STA in the plurality of STAs first makes a reply, and then, another STA makes a corresponding reply based on corresponding trigger information.

In the foregoing embodiment, the STA may reply to the AP by using a data frame that includes the acknowledgment information. When the AP aggregates and sends the first MAC frame and the trigger frame together by using the A-MPDU, where the trigger frame carries the trigger information, the STA may alternatively make a reply by using a block acknowledgment (BA) frame. This is not specifically limited in this application.

Optionally, in this embodiment of this application, the AP may send, to each STA, a MAC frame that carries a TWT information element (IE) described in Table 1. A TWT parameter is given in a corresponding field in the TWT IE. Alternatively, in a corresponding field in the TWT IE, the STA is instructed to give a TWT parameter.

Some frame formats of the TWT IE are described in Table 1.

| Element identifier | Length | Control | Request type | Target wake time | TWT group assignment | Nominal minimum wake duration | TWT wake interval mantissa | TWT channel | NDP paging (optional) |
|---|---|---|---|---|---|---|---|---|---|
| | TWT request | TWT setup request | Reserved | Implicit | Flow type | TWT flow identifier | TWT wake interval index | TWT protection | |

As described in Table 1, some fields of the TWT IE are set as follows:

TWT request: 0 indicates a TWT sent from a requesting side; 1 indicates a TWT replied by a responding side.

Implicit: 0 indicates an explicit TWT; 1 indicates an implicit TWT.

TWT flow identifier: indicating a negotiated TWT number. The AP may negotiate a plurality of wake times with one STA, and may negotiate a TWT start time, TWT duration, a channel parameter used in a wake period, and the like.

A TWT setup command field in a TWT IE of the requesting side is set as follows:

0: Request TWT, indicating that the requesting side requests the responding side to give a TWT parameter;

1: Suggest TWT, indicating that the requesting side gives a suggested TWT parameter, and may accept a parameter given by the responding side; and 2: Demand TWT, indicating that the requesting side gives a mandatory TWT parameter, and does not accept a parameter given by the responding side.

A TWT setup command field in a TWT IE of the responding side is set as follows:

3: TWT grouping, indicating that the responding side gives a parameter of a TWT group, and the parameter given by responding side is different from that given by the requesting side;

4: Accept TWT, indicating that the responding side accepts a parameter given by the requesting side, and that a TWT setup is successful;

5: Alternate TWT, indicating that the responding side gives a parameter different from a parameter given by the requesting side, and may accept the parameter given by the requesting side;

6: Dictate TWT, indicating that the responding side gives a parameter different from a parameter given by the requesting side, and does not accept the parameter given by the requesting side; and 7: Reject TWT, indicating that the responding side rejects a TWT setup, and that the TWT setup fails.

4, 5, or 6 is sent only when the TWT setup command field in the MAC frame returned by the responding side is neither 3 nor 7, and in this case, the requesting side continues to send a MAC frame that carries a TWT IE, to perform negotiation.

Figure 3:
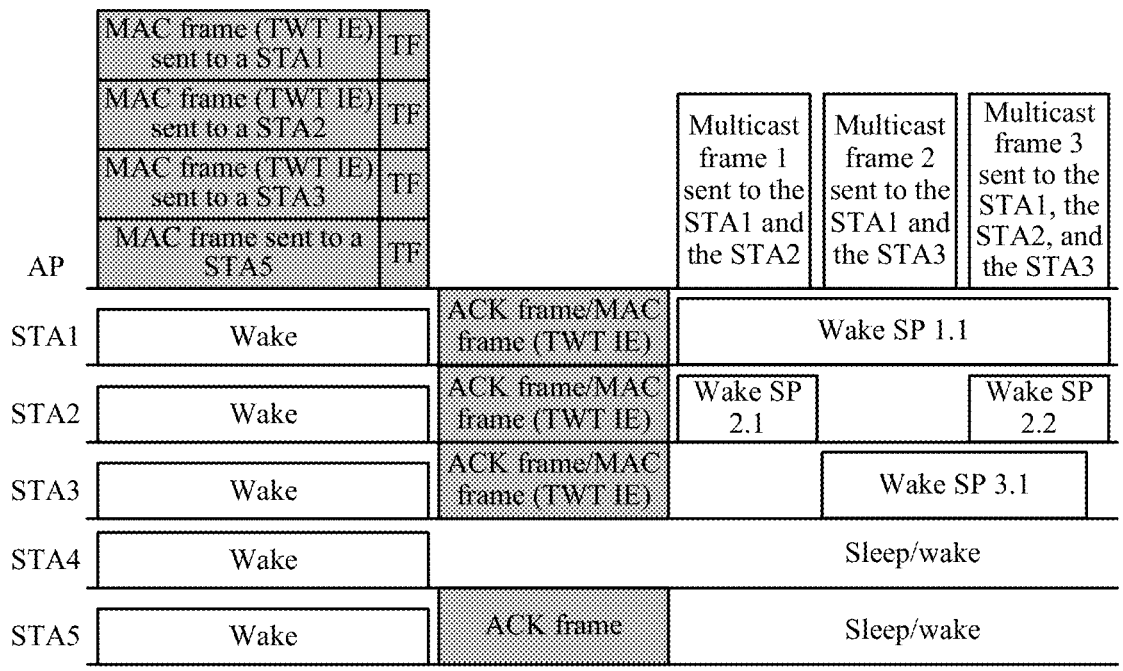
FIG. 3 is a schematic block diagram of a method for negotiating a target wake time TWT according to an embodiment of this application.
Figure 4:
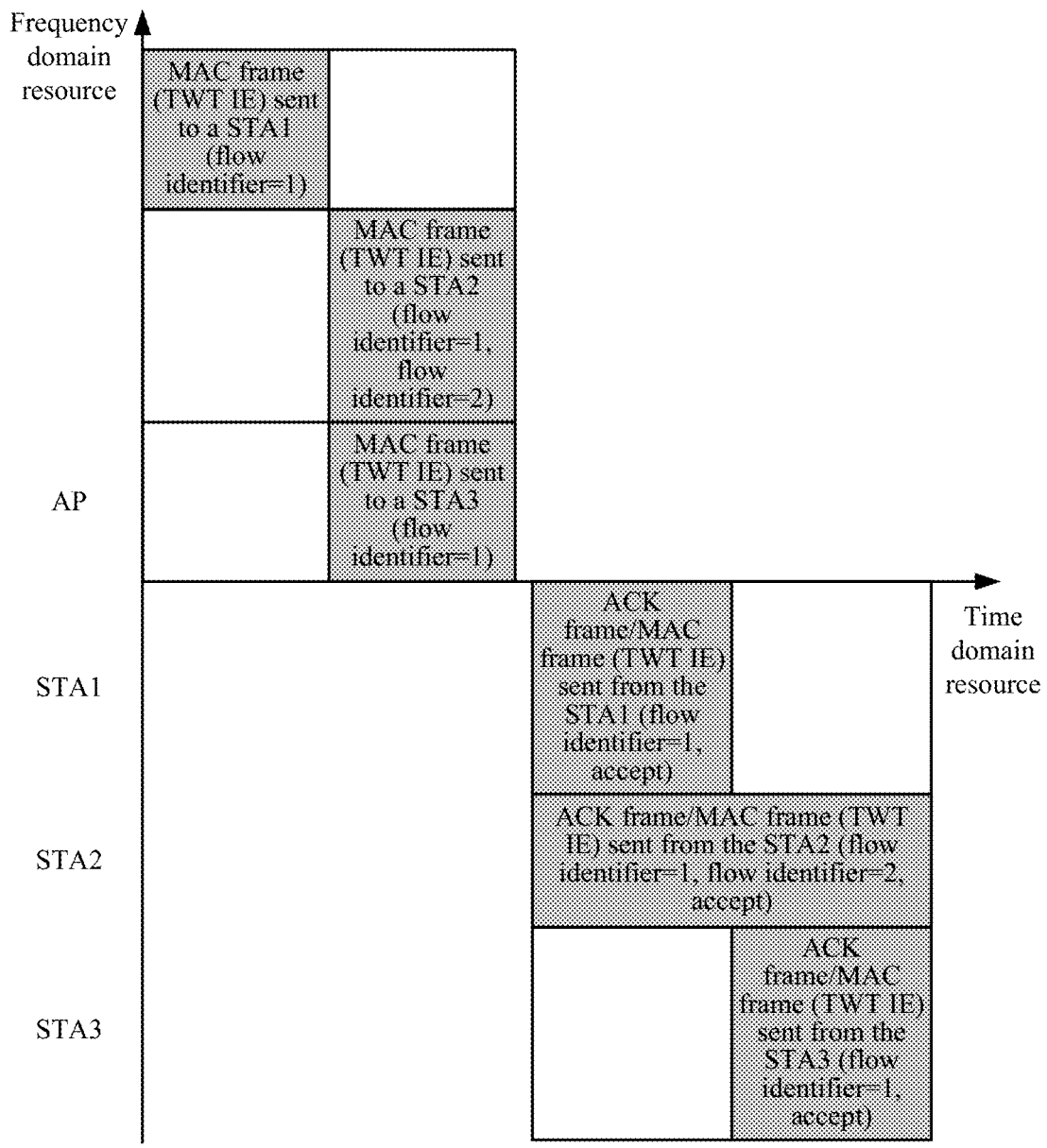
FIG. 4 is a schematic block diagram of a method for negotiating a target wake time TWT according to an embodiment of this application.

The following describes, with reference to FIG. 3 and FIG. 4, the method for negotiating a target wake time TWT according to this embodiment of this application by using an example.

Now, the following scenario is assumed: There are five STAs, which are a STA1, a STA2, a STA3, a STA4, and a STA5, respectively. An AP needs to deliver three multicast frames: a multicast frame 1, a multicast frame 2, and a multicast frame 3. The multicast frame 1 is sent to the STA1 and the STA2, the multicast frame 2 is sent to the STA1 and the STA3, and the multicast frame 3 is sent to the STA1, the STA2, and the STA3.

In wake times of the STAs shown in FIG. 3, the AP sends, in an OFDMA mode to the STAs that need to receive a multicast frame, MAC frames that carry a TWT IE, to perform negotiation, giving TWT parameters or requesting the STAs to give TWT parameters. Moreover, a MAC frame sent to one STA may carry a plurality of TWT IEs. That is, the AP may negotiate a plurality of TWT SPs with one STA at a time. As shown in FIG. 3, the AP sends a trigger frame (TF) by using an A-MPDU, to indicate resource scheduling information for uplink transmission of the STA. The STAs check whether their own TWT IEs exist in these MAC frames. When the STA4 does not find its own MAC frame, the STA4 goes to sleep or stays awake all the time. The STA5 receives a MAC frame, but the MAC frame does not carry a TWT IE. The STA5 does not need to negotiate a TWT with the AP now. For example, the MAC frame may be a data frame sent by the AP to the STA5. In this case, the STA5 receives the MAC frame, but does not need to negotiate a TWT with the AP. After correctly receiving the data frame, the STA5 makes a reply by sending an ACK frame to the AP. The STA1, the STA2, and the STA3 obtain TWT IEs sent to them. Then, after the STA1, the STA2, and the STA3 reply, on respective resource blocks, with ACK frames or MAC frames that carry a TWT IE, their respective TWTs are set up, and the STA1, the STA2, and the STA3 are awake in predetermined times to receive multicast frames. Specifically, the STA1 stays awake in a service period SP1.1 to receive the multicast frame 1, the multicast frame 2, and the multicast frame 3. The STA2 stays awake in service periods SP2.1 and SP2.2 to receive the multicast frame 1 and the multicast frame 3. The STA3 stays awake in a service period SP3.1 to receive the multicast frame 2 and the multicast frame 3.

A specific process of negotiation by the AP in the OFDMA mode is shown in FIG. 4. A MAC frame sent by the AP to the STA2 carries two TWT IEs, and TWT flow identifiers of the two TWT IEs are 1 and 2. Then, each STA replies with a MAC frame on a corresponding resource block according to an instruction of a trigger frame. A MAC frame returned by the STA2 carries two TWT IEs, and both the two TWT IEs indicate that the STA2 accepts a TWT parameter given by the AP.

Therefore, according to the method for negotiating a TWT in this embodiment of this application, the AP can simultaneously negotiate with the plurality of STAs a TWT parameter of each STA by sending the corresponding first MAC frame to each of the plurality of STAs simultaneously. In this way, a prior-art disadvantage that an AP can negotiate a TWT parameter with only one STA at a time can be overcome. Therefore, negotiation efficiency can be improved.

FIG. 5 is a flowchart of a method for negotiating a target wake time TWT according to another embodiment of this application. The following details the method for negotiating a target wake time TWT according to this embodiment of this application with reference to FIG. 5.

401. An AP sends trigger information to a plurality of stations STAs.

The trigger information may instruct at least two STAs to send first MAC frames to the AP. The first MAC frame may carry a TWT parameter of a corresponding STA, or may carry instruction information. The instruction information is used to instruct the AP to send, to a corresponding STA, a second MAC frame that carries a TWT parameter of the corresponding STA.

In addition, the trigger information may indicate by default that the STA is free to select whether to send a first MAC frame that carries a TWT parameter.

The trigger information may further include resource scheduling information for uplink transmission of a STA. The resource scheduling information may include a resource block indication used, a modulation and coding scheme required, a quantity of spatial flows, a length of a physical protocol data unit, and the like when the STA performs multi-user uplink transmission.

402. The AP receives a first MAC frame sent by each of some or all of the plurality of STAs based on the trigger information.

The some or all of the plurality STAs may send the first MAC frames by using at least one of an OFDMA technology and an MU-MIMO technology. In addition, the some or all of the plurality of STAs may alternatively send the first MAC frames by using both an OFDMA technology and an MU-MIMO technology.

According to the method for negotiating a TWT in this embodiment of this application, the plurality of STAs are triggered by the AP to proactively and simultaneously initiate TWT negotiation. In this way, the AP can simultaneously negotiate TWTs with the plurality of STAs, so that a prior-art disadvantage that an AP can negotiate a TWT parameter with only one STA at a time can be overcome. Therefore, negotiation efficiency can be improved.

Optionally, the method may further include: 403. The AP sends acknowledgment information to a corresponding STA based on a TWT parameter of the STA carried in a first MAC frame.

That the AP sends the acknowledgment information to the STA indicates that the AP has correctly received the TWT parameter sent by the STA and accepts the TWT parameter given by the STA. The acknowledgment information may be an acknowledgment ACK frame sent by the AP to the STA. Alternatively, the acknowledgment information may be sent by the AP to the STA by using a given field in a sent data frame.

In addition, when receiving the TWT parameter sent by the STA, the AP may not reply to the STA. In this case, the STA may consider by default that the AP has correctly received the TWT parameter, and is to stay awake in an agreed time to receive data sent by the AP.

Optionally, the method may further include: 404. The AP sends a second MAC frame to a corresponding STA based on instruction information carried in a first MAC frame.

The AP may specify a TWT parameter of the STA based on the instruction information, and send, to the STA, a second MAC frame that carries the TWT parameter. After receiving the second MAC frame, the STA may not reply to the AP. In this case, the AP may consider by default that the STA has correctly received the TWT parameter, and is to stay awake in an agreed time to receive data sent by the AP. In addition, after receiving the second MAC frame, the STA may alternatively send acknowledgment information to the AP. This indicates that the STA has correctly received the TWT parameter, and is to stay awake in an agreed time to receive data sent by the AP.

Optionally, in this embodiment of this application, the STA may send, to the AP, a MAC frame that carries a TWT IE. A TWT parameter is given in a corresponding field in the TWT IE. Alternatively, in a corresponding field in the TWT IE, the AP is instructed to give a TWT parameter.

Figure 6:
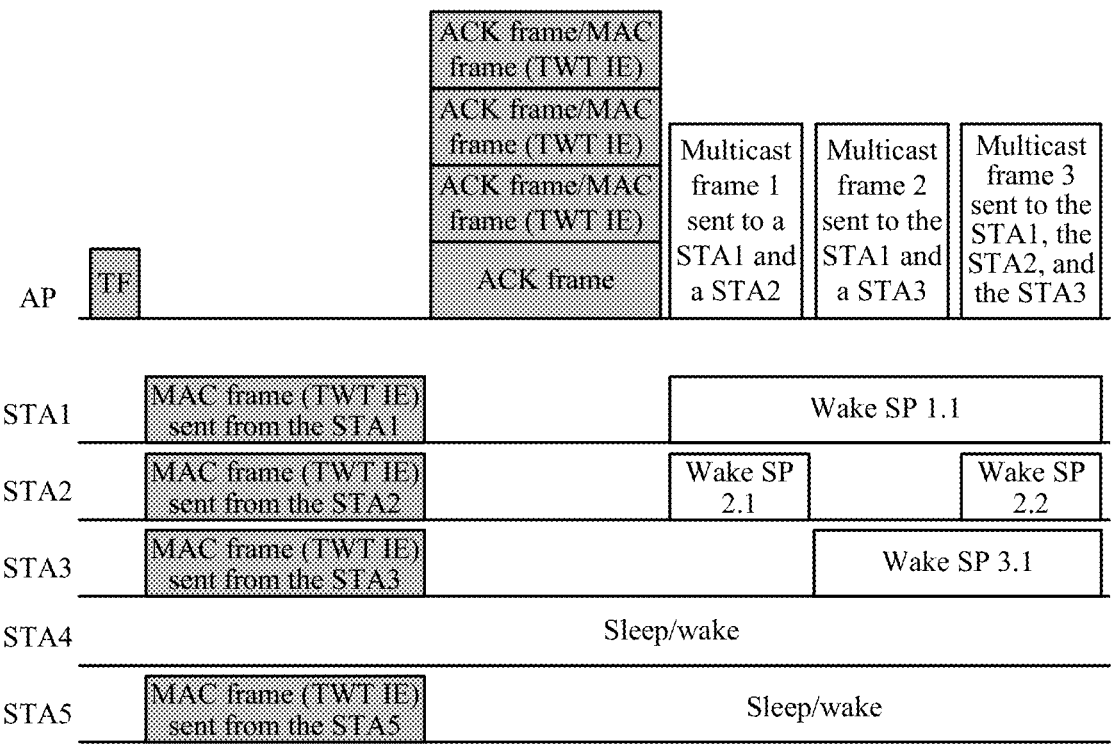
FIG. 6 is a schematic block diagram of a method for negotiating a target wake time TWT according to another embodiment of this application.

The following describes, with reference to FIG. 6, the method for negotiating a target wake time TWT according to this embodiment of this application by using an example.

Now, the following scenario is assumed: There are five STAs, which are a STA1, a STA2, a STA3, a STA4, and a STA5, respectively. An AP needs to deliver three multicast frames: a multicast frame 1, a multicast frame 2, and a multicast frame 3. The multicast frame 1 is sent to the STA1 and the STA2, the multicast frame 2 is sent to the STA1 and the STA3, and the multicast frame 3 is sent to the STA1, the STA2, and the STA3.

As shown in FIG. 6, the AP sends a trigger frame TF to the STA1, the STA2, and the STA3, to instruct the STA1, the STA2, and the STA3 to transmit uplink MAC frames that carry a TWT IE. The AP also sends a trigger frame TF to the STA5, to indicate that the STA5 does not need to negotiate a TWT with the AP. The STA5 may transmit an uplink data-type MAC frame based on the trigger frame TF. Because the STA4 does not need to receive a multicast frame, the TF frame sent by the AP may indicate that the STA4 does not need to send a MAC frame that carries a TWT IE, to perform TWT negotiation. Then, the STA4 enters a sleep state or a wake state. The STA1, the STA2, and the STA3 send, on respective resource blocks and in an OFDMA mode, MAC frames that carry a TWT IE, giving their TWT parameters or requesting the AP to give TWT parameters. The STA5 sends a data-type MAC frame on a resource block of the STA5. The AP then replies, to the STA1, the STA2, and the STA3, with ACK frames or MAC frames that carry a TWT IE, to perform negotiation, and sends an ACK frame to the STA5 to make an acknowledgment reply. The, the STA1, the STA2, and the STA3 stay awake in predetermined TWT SPs to receive their multicast frames, and the STA5 enters a sleep state or wake state. Specifically, the STA1 stays awake in a service period SP1.1 to receive the multicast frame 1, the multicast frame 2, and the multicast frame 3. The STA2 stays awake in service periods SP2.1 and SP2.2 to receive the multicast frame 1 and the multicast frame 3. The STA3 stays awake in a service period SP3.1 to receive the multicast frame 2 and the multicast frame 3.

FIG. 7 is a flowchart of a method for negotiating a target wake time TWT according to still another embodiment of this application. The following details the method for negotiating a target wake time TWT according to this embodiment of this application with reference to FIG. 7.

601. An AP generates a first MAC frame, where the first MAC frame carries a plurality of pieces of target wake time TWT information that are corresponding to first stations STAs in a plurality of STAs in a one-to-one manner.

The first STAs may be all of the plurality of STAs or some of the plurality of STAs. The first MAC frame may carry TWT information of the plurality of STAs, or TWT information of only some of the plurality of STAs. The TWT information may be a TWT parameter of a corresponding STA, or instruction information for instructing a corresponding STA to send a TWT parameter of the STA to the AP.

In this embodiment of this application, the first MAC frame may be a beacon frame sent by the AP. This is not limited in this application.

602. The AP sends the first MAC frame to the plurality of STAs, where the first MAC frame is used for each of the first STAs to determine a TWT parameter of the STA based on corresponding TWT information.

The AP broadcasts the first MAC frame to the plurality of STAs, and after receiving the first MAC frame, a STA determines a TWT parameter of the STA based on TWT information that is in the first MAC frame and that is corresponding to the STA. The STA may determine the TWT parameter that is in the first MAC frame and that is corresponding to the STA, as a final TWT parameter. That is, a TWT SP is determined. Alternatively, if the first MAC frame carries instruction information, the STA may determine the TWT parameter by itself, and send the TWT parameter to the AP.

It should be noted that TWT parameters that are of the STAs and that may be carried in the first MAC frame may be the same or different. In other words, all the STAs may stay awake in a same time period or may stay awake in different time periods, to receive data sent by the AP.

According to the method for negotiating a TWT in this embodiment of this application, the AP can simultaneously negotiate TWTs with some or all of the plurality of STAs by sending, to the plurality of STAs, TWT information of the some or all of the plurality of STAs, so that a prior-art disadvantage that an AP can negotiate a TWT parameter with only one STA at a time can be overcome. Therefore, negotiation efficiency can be improved.

Optionally, in step 601, the AP may generate the first MAC frame by aggregating a plurality of MAC frames that are corresponding to the first STAs in a one-to-one manner. That is, a multiple destination aggregate MAC protocol data unit (MD-A-MPDU) may be used to directly carry TWT information of the plurality of STAs. Destination addresses of the plurality of aggregated MAC frames point to different STAs, and a STA may identify, based on a receiver address of a MAC frame, whether TWT information carried in the MD-A-MPDU is sent to the STA.

Optionally, in step 601, the AP may generate the first MAC frame by generating a first information element that carries the plurality of pieces of TWT information. The first information element may include a plurality of first fields and a plurality of second fields, each first field defines a unique identifier ID corresponding to an $i^{th}$ STA in the first STAs, and each second field defines TWT information corresponding to the $i^{th}$ STA.

For example, the first information element may be the TWT IE described in Table 1. As described in Table 2, an IE used for multi-user TWT negotiation may be generated by re-defining the TWT IE described in Table 1.

TABLE 2

IE used for multi-user TWT negotiation

| Element identifier | Length | Unique identifier of STA1 | TWT information | Unique identifier of STA2 | TWT information | ... |
|---|---|---|---|---|---|---|

The AP may negotiate TWTs with some or all of the plurality of STAs by sending, to the plurality of STAs, a first MAC frame that carries the IE used for multi-user TWT negotiation. For example, the STA1 may obtain, based on the "unique identifier of STAT" field in Table 2, TWT information corresponding to the STA1, that is, content in the "TWT information" field following the "unique identifier of STAT" field. Likewise, the STA2 may obtain, based on the "unique identifier of STA2" field in Table 2, TWT information corresponding to the STA2. Further, the STA1 and the STA2 may negotiate TWTs with the AP based on the TWT parameter in the TWT information or based on the instruction information. If a STA, for example, the STA4, finds no "unique identifier of STA4" field in Table 2, the STA does not negotiate a TWT parameter with the AP, and then goes to sleep or stays awake all the time.

Optionally, as shown in FIG. 7, the method may further include: 603. The AP sends trigger information to the first STAs, where the trigger information includes resource scheduling information for uplink transmission of each of the first STAs. The STA may reply to the AP based on the corresponding resource scheduling information.

Optionally, in step 601, the AP generates the first MAC frame by generating a trigger frame that carries the plurality of pieces of TWT information. The trigger frame may include a plurality of third fields, fourth fields, and fifth fields, each third field defines a unique identifier ID corresponding to an $i^{th}$ STA in the first STAs, each fourth field defines resource scheduling information corresponding to the $i^{th}$ STA in the first STAs, and each fifth field defines TWT information corresponding to the $i^{th}$ STA in the first STAs.

For example, the trigger frame may be a trigger frame used for multi-user TWT negotiation described in Table 3. A "TWT information" field of the STA2. The AP may negotiate a plurality of SPs with the STA2, and may define the "TWT information 1" field, the "TWT information 2" field, and the "TWT information 3" field that follow the resource scheduling information field of the STA2, as TWT information of the STA2.

Resource scheduling information of a STA may include a resource block indication used, a modulation and coding scheme required, a quantity of spatial flows, a length of a physical protocol data unit, and the like when the STA performs multi-user uplink transmission.

TABLE 3

| Trigger frame used for multi-user TWT negotiation | | | | | | | | | |
|---|---|---|---|---|---|---|---|---|---|
| MAC frame header | Unique identifier of STA1 | Resource scheduling information | TWT information | Unique identifier of STA2 | Resource scheduling information | TWT information 1 | TWT information 2 | TWT information 3 | ... |

Optionally, in step 601, the AP generates the first MAC frame by generating a second information element that carries the plurality of pieces of TWT information. The second information element includes a plurality of sixth fields, and each sixth field defines TWT information corresponding to an $i^{th}$ STA in the first STAs. The MAC frame may further include a plurality of seventh fields and a plurality of eighth fields. Each seventh field defines a unique identifier ID corresponding to the $i^{th}$ STA in the first STAs, and each eighth field defines resource scheduling information corresponding to the $i^{th}$ STA in the first STAs.

For example, the second information element may be the TWT IE described in Table 1. A MAC frame used for multi-user TWT negotiation is described in Table 4. TWT information of a STA may be defined in the MAC frame. For example, TWT information of the STA1 may be defined in the field "TWT information (STA1)", and TWT information of the STA2 may be defined in the field "TWT information 1 (STA2)", the field "TWT information 2 (STA2)", and the field "TWT information 3 (STA2)". In this case, the AP may negotiate three same or different TWT SPs with the STA2.

In addition, some fields in the first MAC frame may also be used to define a unique identifier of a STA and resource scheduling information of the STA. The resource scheduling information of the STA may include a resource block indication used, a modulation and coding scheme required, a quantity of spatial flows, a length of a PPDU, and the like when the STA performs multi-user uplink transmission. The field defining the unique identifier of the STA may follow a field defining resource scheduling information of the STA, and a field defining TWT information of the STA in the MAC frame may have a same ordinal position as a previous field defining a unique identifier of the STA.

TABLE 4

| MAC frame used for multi-user TWT negotiation | | | | | | | | | | | |
|---|---|---|---|---|---|---|---|---|---|---|---|
| MAC frame header | Unique identifier of STA1 | Resource scheduling information | Unique identifier of STA2 | Resource scheduling information | Element identifier | Length | TWT information (STA1) | TWT information 1 (STA2) | TWT information 2 (STA2) | TWT information 3 (STA2) | ... | field of a unique identifier ID of the $i^{th}$ STA may precede a field defining resource scheduling information of the STA and a field defining TWT information of the STA. For example, the "unique identifier of STA2" field in Table 3 precedes a resource scheduling information field and a Optionally, the first MAC frame may further include a group identifier field, and the group identifier field indicates a group to which each STA belongs.

For example, as described in Table 5, in an IE that is used for multi-user TWT negotiation and that includes a group identifier, a "group identifier" field may be defined, representing a group to which a STA that requires TWT negotiation belongs.

TABLE 5

IE that is used for multi-user TWT negotiation and that includes a group identifier

| Element identifier | Length | Group identifier | Unique identifier of STA1 | Resource scheduling information | TWT information | Unique identitifer of STA2 | Resource scheduling information | TWT information | ... |
|---|---|---|---|---|---|---|---|---|---|

In this embodiment of this application, a "group identifier" field may also be defined in the fields in the IE or the MAC frame described in Table 2 to Table 4. For brevity, details are not described herein.

In the prior art, a TWT SP common to STAs in one TWT group may be configured by using a "TWT group assignment" field in a TWT IE in 802.11ah. The AP classifies several STAs into a group, referred to as a TWT group. A TWT SP in which this group of STAs are all awake is defined by using the "TWT group assignment" field, and the group is indicated by a group identifier. A STA learns of, from a group identifier, which group the STA belongs to, and only needs to be awake in a predetermined wake time of the group.

However, in the prior art, TWT SPs of STAs in a same group are the same, lacking flexibility. In this embodiment of this application, TWT SPs of STAs in a same group may be the same or different, providing higher flexibility.

In addition, in subsequent TWT negotiation, the AP may perform TWT negotiation with a grouped STA and a newly scheduled STA simultaneously. This can improve negotiation efficiency and save energy of a STA.

Optionally, as shown in FIG. 7, the method may further include: 604. The AP receives acknowledgment information sent by some or all of the first STAs based on the trigger information when the some or all of the first STAs determine corresponding TWT parameters carried in the first MAC frame.

Specifically, when receiving a TWT parameter sent by the AP, a STA may send an acknowledgment to the AP. This indicates that the STA has correctly received the TWT parameter and accepts the TWT parameter, and is to stay awake in a TWT SP indicated by the TWT parameter, to receive data sent by the AP. In addition, the STA may alternatively not rely to the AP, and the AP considers by default that the STA has correctly received and accepts the TWT parameter. Then, the AP sends data to the STA in a TWT SP indicated by the TWT parameter.

Optionally, as shown in FIG. 7, the method may further include: 605. The AP receives second MAC frames sent by some or all of the first STAs based on the trigger information and corresponding instruction information that is carried in the first MAC frame, where TWT information carried in the second MAC frame carries a TWT parameter determined by a corresponding STA.

Specifically, when receiving instruction information sent by the AP, a STA may determine a TWT parameter by itself, and send, to the AP, a second MAC frame that carries the TWT parameter determined by the STA, so as to negotiate a TWT with the AP. After receiving the second MAC frame, the AP may reply with acknowledgment information, indicating that the negotiation is successful. Afterwards, the AP sends data to the STA in a TWT SP indicated by the TWT parameter.

Figure 8:
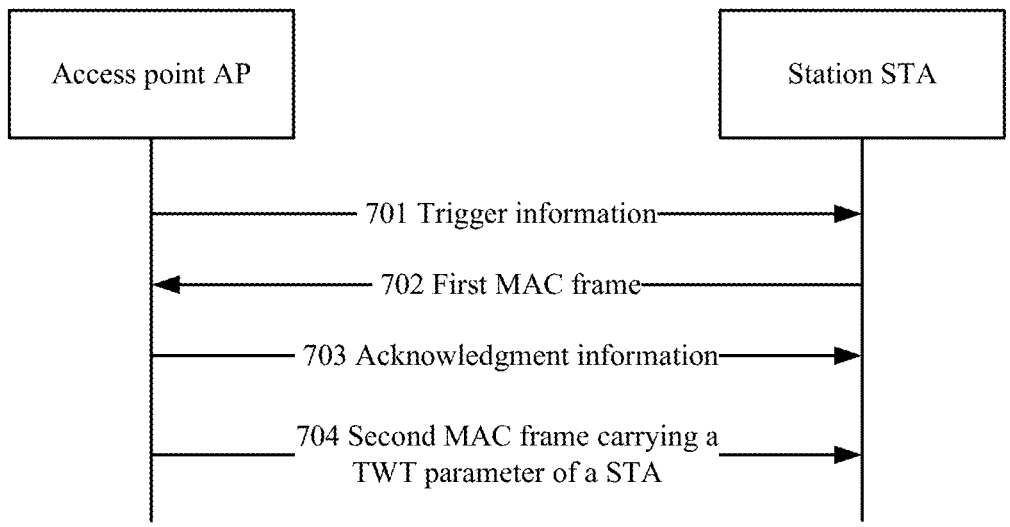
FIG. 8 is a schematic flowchart of a method for negotiating a target wake time TWT according to still another embodiment of this application.

FIG. 8 is a flowchart of a method for negotiating a target wake time TWT according to an embodiment of this application. The following details the method for negotiating a target wake time TWT according to this embodiment of this application with reference to FIG. 8.

701. A STA receives trigger information sent by an access point AP, where the trigger information is used to instruct the STA to send a first media access control MAC frame corresponding to the STA to the AP.

702. The STA sends a first MAC frame to the AP based on the trigger information, where the first MAC frame carries a target wake time TWT parameter of the STA or instruction information for instructing the AP to send a TWT parameter to the STA, and the TWT parameter is used for the AP to send acknowledgment information to the STA.

Optionally, the STA may send the first MAC frame to the AP based on the trigger information by using at least one of an OFDMA technology and a MU-MIMO technology.

Optionally, the method further includes: 703. The STA receives acknowledgment information sent by the AP based on the TWT parameter of the STA carried in the first MAC frame.

Optionally, the method further includes: 704. The STA receives a second MAC frame that carries the TWT parameter of the STA and that is sent by the AP based on the instruction information carried in the first MAC frame.

In this embodiment of this application, a STA in a plurality of STAs may be triggered by the AP to negotiate a TWT with the AP. When the STA negotiates the TWT with the AP, another STA may also be triggered by the AP to negotiate a TWT with the AP. Therefore, negotiation efficiency can be improved.

The foregoing has detailed the method for negotiating a target wake time TWT according to the embodiments of this application with reference to FIG. 2 to FIG. 8. The following describes an access point AP according to the embodiments of this application with reference to FIG. 9 to FIG. 11.

Figure 9:
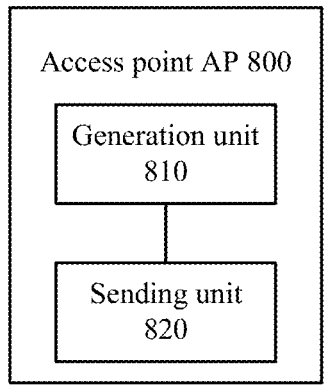
FIG. 9 is a schematic block diagram of an access point AP according to an embodiment of this application.

FIG. 9 is a schematic block diagram of an access point (AP) 800 according to an embodiment of this application. The AP 800 may include a generation unit 810 and a sending unit 820.

The generation unit 810 may generate a plurality of first media access control MAC frames, where the plurality of first MAC frames are corresponding to a plurality of stations STAs in a one-to-one manner, and each of the plurality of first MAC frames carries a target wake time TWT parameter of a corresponding STA or instruction information for instructing a corresponding STA to send a TWT parameter.

The sending unit 820 may send, to each of the plurality of STAs simultaneously, a corresponding first MAC frame generated by the generation unit 810, where the first MAC frame is used to determine a TWT parameter with a STA corresponding to the first MAC frame.

According to this embodiment of this application, the AP can simultaneously negotiate with the plurality of STAs a TWT parameter of each STA by sending the corresponding first MAC frame to each of the plurality of STAs simultaneously. In this way, a prior-art disadvantage that an AP can negotiate a TWT parameter with only one STA at a time can be overcome. Therefore, negotiation efficiency can be improved.

Optionally, the sending unit 820 may be specifically configured to send the corresponding first MAC frame to each of the plurality of STAs simultaneously by using at least one of an OFDMA technology and an MU-MIMO technology.

Optionally, each of the plurality of first MAC frames carries trigger information of the corresponding STA, and the trigger information includes resource scheduling information for uplink transmission of the corresponding STA. In this case, the access point AP 800 may further include: a first receiving unit, configured to receive acknowledgment information sent by some or all STAs of the plurality of STAs based on the corresponding trigger information when the some or all of the first STAs determine TWT parameters carried in corresponding first MAC frames, and/or receive second MAC frames sent by some or all of the plurality of STAs based on corresponding trigger information and instruction information that is carried in corresponding first MAC frames, where the second MAC frame carries a TWT parameter determined by a corresponding STA.

Optionally, the sending unit 820 is further configured to send trigger information to first STAs in the plurality of STAs, where the trigger information includes resource scheduling information for uplink transmission of each of the first STAs. In this case, the AP 800 may further include: a second receiving unit, configured to receive acknowledgment information sent by some or all of the first STAs based on the trigger information when the some or all of the first STAs determine TWT parameters carried in corresponding first MAC frames, and/or receive second MAC frames sent by some or all of the first STAs based on the trigger information and instruction information that is carried in corresponding first MAC frames, where the second MAC frame carries a TWT parameter determined by a corresponding STA.

Optionally, the sending unit 820 may be specifically configured to send trigger information of corresponding STAs in the first STAs by sending corresponding aggregate MAC protocol data units to the first STAs, where the aggregate MAC protocol data unit includes a first MAC frame and a trigger frame of a corresponding STA, and the trigger frame carries trigger information of the corresponding STA.

It should be understood that the AP 800 herein is embodied in a form of a functional unit. The term "unit" herein may be an application-specific integrated circuit (ASIC), an electronic circuit, a processor configured to execute one or more software or firmware programs (for example, a shared processor, a dedicated processor, or a group processor) and a memory, or a merged logic circuit and/or another appropriate component supporting the described functions. In an optional example, a person skilled in the art may understand that the AP 800 may be specifically the AP in the method shown in FIG. 2, and the AP 800 may be configured to perform the procedures and/steps corresponding to the access point AP that are in the method shown in FIG. 2. To avoid repetition, details are not described herein again.

Figure 10:
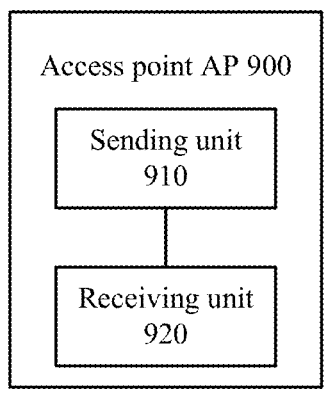
FIG. 10 is a schematic block diagram of an access point AP according to another embodiment of this application.

FIG. 10 is a schematic block diagram of an access point (AP) 900 according to another embodiment of this application. The AP 900 may include a sending unit 910 and a receiving unit 920.

The sending unit 910 may send trigger information to a plurality of stations STAs, where the trigger information is used to instruct each of some or all of the plurality of STAs to send a first media access control MAC frame corresponding to the STA.

The receiving unit 920 may receive the first MAC frame sent by each of the some or all of the plurality of STAs based on the trigger information sent by the sending unit 910, where the first MAC frame carries a target wake time TWT parameter of the corresponding STA or instruction information for instructing the AP to send a TWT parameter to the corresponding STA, the TWT parameter is used to negotiate a TWT of the corresponding STA, and the instruction information is used to instruct the AP to send, to the corresponding STA, a second MAC frame that carries the TWT parameter of the corresponding STA.

According to this embodiment of this application, the plurality of STAs are triggered by the AP to proactively and simultaneously initiate TWT negotiation. In this way, the AP can simultaneously negotiate TWTs with the plurality of STAs, so that a prior-art disadvantage that an AP can negotiate a TWT parameter with only one STA at a time can be overcome. Therefore, negotiation efficiency can be improved.

Optionally, the receiving unit 920 may be specifically configured to receive the first MAC frames sent by the some or all of the plurality of STAs based on the trigger information by using at least one of an OFDMA technology and an MU-MIMO technology.

Optionally, the sending unit 910 may be further configured to send acknowledgment information to the corresponding STA based on the TWT parameter of the STA carried in the first MAC frame, or send the second MAC frame to the corresponding STA based on the instruction information carried in the first MAC frame.

It should be understood that the AP 900 herein is embodied in a form of a functional unit. The term "unit" herein may be an application-specific integrated circuit (ASIC), an electronic circuit, a processor configured to execute one or more software or firmware programs (for example, a shared processor, a dedicated processor, or a group processor) and a memory, or a merged logic circuit and/or another appropriate component supporting the described functions. In an optional example, a person skilled in the art may understand that the AP 900 may be specifically the AP in the method shown in FIG. 5, and the AP 900 may be configured to perform the procedures and/steps corresponding to the access point AP that are in the method shown in FIG. 5. To avoid repetition, details are not described herein again.

Figure 11:
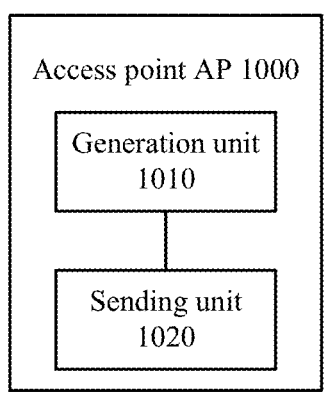
FIG. 11 is a schematic block diagram of an access point AP according to still another embodiment of this application.

FIG. 11 is a schematic block diagram of an access point (AP) 1000 according to another embodiment of this application. The AP 1000 may include a generation unit 1010 and a sending unit 1020.

The generation unit 1010 may generate a first media access control MAC frame, where the first MAC frame carries a plurality of pieces of target wake time TWT information that are corresponding to first station STAs in a plurality of STAs in a one-to-one manner.

The sending unit 1020 may send, to the plurality of STAs, the first MAC frame generated by the generation unit 1010, where the first MAC frame is used for each of the first STAs to determine a TWT parameter of the STA based on corresponding TWT information.

According to this embodiment of this application, the AP can simultaneously negotiate TWTs with some or all of the plurality of STAs by sending, to the plurality of STAs, TWT information of the some or all of the plurality of STAs, so that a prior-art disadvantage that an AP can negotiate a TWT parameter with only one STA at a time can be overcome. Therefore, negotiation efficiency can be improved.

Optionally, the generation unit 1010 may be specifically configured to generate the first MAC frame by aggregating a plurality of MAC frames that are corresponding to the first STAs in a one-to-one manner.

Optionally, the generation unit 1010 may be specifically configured to generate the first MAC frame by generating a first information element that carries the plurality of pieces of TWT information, where the first information element includes a plurality of first fields and a plurality of second fields, each first field defines a unique identifier ID corresponding to an $i^{th}$ STA in the first STAs, and each second field defines TWT information corresponding to the $i^{th}$ STA.

Optionally, the generation unit 1010 may be specifically configured to generate the first MAC frame by generating a trigger frame that carries the plurality of pieces of TWT information, where the trigger frame includes a plurality of third fields, fourth fields, and fifth fields, each third field defines a unique identifier ID corresponding to an $i^{th}$ STA in the first STAs, each fourth field defines resource scheduling information corresponding to the $i^{th}$ STA in the first STAs, and each fifth field defines TWT information corresponding to the $i^{th}$ STA in the first STAs.

Optionally, the generation unit 1010 may be specifically configured to generate the first MAC frame by generating a second information element that carries the plurality of pieces of TWT information, where the second information element includes a plurality of sixth fields, and each sixth field defines TWT information corresponding to an $i^{th}$ STA in the first STAs; and the MAC frame further includes a plurality of seventh fields and a plurality of eighth fields, where each seventh field defines a unique identifier ID corresponding to the $i^{th}$ STA in the first STAs, and each eighth field defines resource scheduling information corresponding to the $i^{th}$ STA in the first STAs.

Optionally, an ordinal position of an $i^{th}$ seventh field is corresponding to an ordinal position of a sixth field that is in the second information element and that defines TWT information of a STA corresponding to the $i^{th}$ seventh field.

Optionally, the sending unit 1020 may be further configured to send trigger information to the first STAs, where the trigger information includes resource scheduling information for uplink transmission of each of the first STAs.

Optionally, the TWT information includes a TWT parameter of a corresponding STA. In this case, the AP 1000 may further include: a first receiving unit, configured to receive acknowledgment information sent by some or all of the first STAs based on the trigger information when the some or all of the first STAs determine corresponding TWT parameters carried in the first MAC frame.

Optionally, the TWT information includes instruction information for instructing the AP to send the TWT parameter to the corresponding STA. In this case, the AP 1000 may further include: a second receiving unit, configured to receive second MAC frames sent by some or all of the first STAs based on the trigger information and corresponding instruction information that is carried in the first MAC frame, where TWT information carried in the second MAC frame carries a TWT parameter determined by a corresponding STA.

It should be understood that the AP 1000 herein is embodied in a form of a functional unit. The term "unit" herein may be an application-specific integrated circuit (ASIC), an electronic circuit, a processor configured to execute one or more software or firmware programs (for example, a shared processor, a dedicated processor, or a group processor) and a memory, or a merged logic circuit and/or another appropriate component supporting the described functions. In an optional example, a person skilled in the art may understand that the AP 1000 may be specifically the AP in the method shown in FIG. 7, and the AP 1000 may be configured to perform the procedures and/steps corresponding to the AP that are in the method shown in FIG. 7. To avoid repetition, details are not described herein again.

Figure 12:
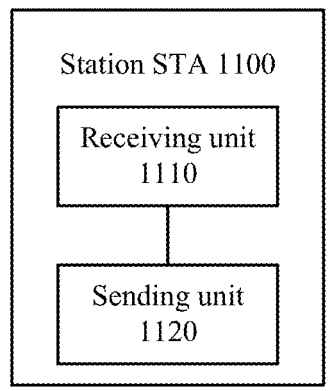
FIG. 12 is a schematic block diagram of a station STA according to an embodiment of this application.

FIG. 12 is a schematic block diagram of a station (STA) 1100 according to another embodiment of this application. The STA 1100 may include a receiving unit 1110 and a sending unit 1120.

The receiving unit 1110 may receive trigger information sent by an access point (AP), where the trigger information is used to instruct the STA to send a first media access control MAC frame corresponding to the STA to the AP.

The sending unit 1120 may send the first MAC frame to the AP based on the trigger information received by the receiving unit 1110, where the first MAC frame carries a target wake time TWT parameter of the STA or instruction information for instructing the AP to send a TWT parameter to the STA, and the TWT parameter is used to negotiate a TWT of the STA.

In this embodiment of this application, a STA in a plurality of STAs may be triggered by the AP to negotiate a TWT with the AP. When the STA negotiates the TWT with the AP, another STA may also be triggered by the AP to negotiate a TWT with the AP. Therefore, negotiation efficiency can be improved.

Optionally, the sending unit 1120 may be specifically configured to send the first MAC frame to the AP based on the trigger information by using at least one of an OFDMA technology and an MU-MIMO technology.

Optionally, the receiving unit 1110 may be further configured to receive acknowledgment information sent by the AP based on the TWT parameter of the STA carried in the first MAC frame, or receive a second MAC frame that carries the TWT parameter of the STA and that is sent by the AP based on the instruction information carried in the first MAC frame.

It should be understood that the STA 1100 herein is embodied in a form of a functional unit. The term "unit" herein may be an application-specific integrated circuit (ASIC), an electronic circuit, a processor configured to execute one or more software or firmware programs (for example, a shared processor, a dedicated processor, or a group processor) and a memory, or a merged logic circuit and/or another appropriate component supporting the described functions.

In an optional example, a person skilled in the art may understand that the STA 1100 may be specifically any one of the STAs in the methods shown in FIG. 2, FIG. 5, and FIG. 7, or may be the STA in the method shown in FIG. 8. The station STA 1100 may be configured to perform the procedures and/or steps that are in the methods shown in FIG. 2, FIG. 5, and FIG. 7 and that are corresponding to any one of the STAs, and may also be configured to perform the procedures and/or steps corresponding to the STA that are in the method shown in FIG. 8. To avoid repetition, details are not described herein again.

Figure 13:
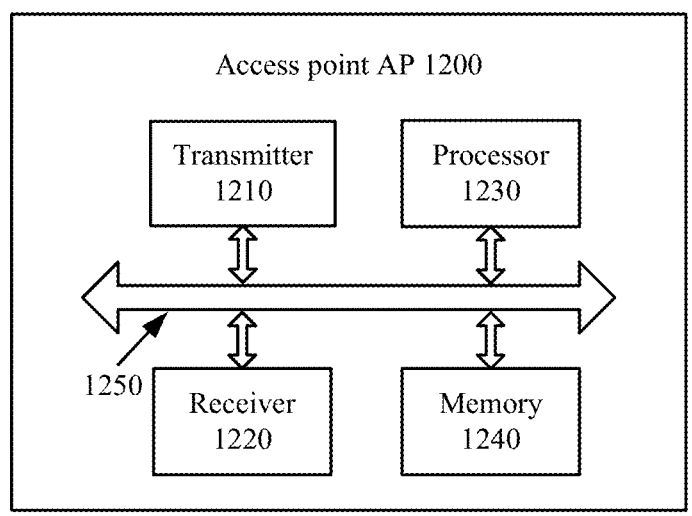
FIG. 13 is a schematic block diagram of an access point AP according to an embodiment of this application.

FIG. 13 shows an access point (AP) 1200 according to an embodiment of this application. The AP 1200 includes a transmitter 1210, a receiver 1220, a processor 1230, a memory 1240, and a bus system 1250. The transmitter 1210, the receiver 1220, the processor 1230, and the memory 1240 are connected by the bus system 1250. The memory 1240 is configured to store an instruction. The processor 1230 is configured to execute the instruction stored in the memory 1240, to control the transmitter 1210 to send a signal and control the receiver 1220 to receive a signal.

The processor 1230 may generate a plurality of first media access control MAC frames, where the plurality of first MAC frames are corresponding to a plurality of STAs in a one-to-one manner, and each of the plurality of first MAC frames carries a target wake time TWT parameter of a corresponding STA or instruction information for instructing a corresponding STA to send a TWT parameter.

The transmitter 1210 may send a corresponding first MAC frame to each of the plurality of STAs simultaneously, where the first MAC frame is used to determine a TWT parameter with a STA corresponding to the first MAC frame.

According to this embodiment of this application, the AP can simultaneously negotiate with the plurality of STAs a TWT parameter of each STA by sending the corresponding first MAC frame to each of the plurality of STAs simultaneously. In this way, a prior-art disadvantage that an AP can negotiate a TWT parameter with only one STA at a time can be overcome. Therefore, negotiation efficiency can be improved.

Optionally, the transmitter 1210 may be specifically configured to send the corresponding first MAC frame to each of the plurality of STAs simultaneously by using at least one of an OFDMA technology and an MU-MIMO technology.

Optionally, each of the plurality of first MAC frames carries trigger information of the corresponding STA, and the trigger information includes resource scheduling information for uplink transmission of the corresponding STA. In this case, the receiver 1220 may be configured to receive acknowledgment information sent by some or all of the plurality of STAs based on corresponding trigger information when the some or all of the first STAs determine TWT parameters carried in corresponding first MAC frames, and/or receive second MAC frames sent by some or all of the plurality of STAs based on corresponding trigger information and instruction information that is carried in corresponding first MAC frames, where the second MAC frame carries a TWT parameter determined by a corresponding STA.

Optionally, the transmitter 1210 may be further configured to send trigger information to first STAs in the plurality of STAs, where the trigger information includes resource scheduling information for uplink transmission of each of the first STAs. In this case, the receiver 1220 may be configured to receive acknowledgment information sent by some or all of the first STAs based on the trigger information when the some or all of the first STAs determine TWT parameters carried in corresponding first MAC frames, and/or receive second MAC frames sent by some or all of the first STAs based on the trigger information and instruction information that is carried in corresponding first MAC frames, where the second MAC frame carries a TWT parameter determined by a corresponding STA.

Optionally, the transmitter 1210 may be specifically configured to send trigger information of corresponding STAs in the first STAs by sending corresponding aggregate MAC protocol data units to the first STAs, where the aggregate MAC protocol data unit includes a first MAC frame and a trigger frame of a corresponding STA, and the trigger frame carries trigger information of the corresponding STA.

It should be understood that the AP 1200 may be specifically the AP 800 in the foregoing embodiment, and may be configured to perform the steps and/or procedures in the method embodiment shown in FIG. 2. Optionally, the memory 1240 may include a read-only memory and a random access memory, and provide an instruction and data to the processor 1230. A part of the memory 1240 may further include a non-volatile random access memory. For example, the memory may further store device type information. The processor 1230 may be configured to execute the instruction stored in the memory. When the processor executes the instruction stored in the memory, the processor is configured to perform the steps and/or procedures in the method embodiment shown in FIG. 2. For brevity, details are not described herein again.

Figure 14:
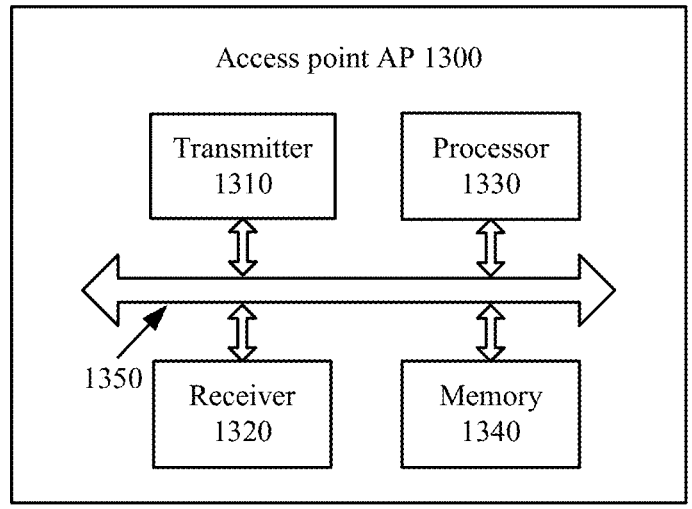
FIG. 14 is a schematic block diagram of an access point AP according to another embodiment of this application.

FIG. 14 shows an access point (AP) 1300 according to an embodiment of this application. The AP 1300 includes a transmitter 1310, a receiver 1320, a processor 1330, a memory 1340, and a bus system 1350. The transmitter 1310, the receiver 1320, the processor 1330, and the memory 1340 are connected by the bus system 1350. The memory 1340 is configured to store an instruction. The processor 1330 is configured to execute the instruction stored in the memory 1340, to control the transmitter 1310 to send a signal and control the receiver 1320 to receive a signal.

The transmitter 1310 may send trigger information to a plurality of stations STAs, where the trigger information is used to instruct each of some or all of the plurality of STAs to send a first media access control MAC frame corresponding to the STA.

The receiver 1320 may receive the first MAC frame sent by each of the some or all of the plurality of STAs based on the trigger information, where the first MAC frame carries a target wake time TWT parameter of the corresponding STA or instruction information for instructing the AP to send a TWT parameter to the corresponding STA, the TWT parameter is used to negotiate a TWT of the corresponding STA, and the instruction information is used to instruct the AP to send, to the corresponding STA, a second MAC frame that carries the TWT parameter of the corresponding STA.

According to this embodiment of this application, the plurality of STAs are triggered by the AP to proactively and simultaneously initiate TWT negotiation. In this way, the AP can simultaneously negotiate TWTs with the plurality of STAs, so that a prior-art disadvantage that an AP can negotiate a TWT parameter with only one STA at a time can be overcome. Therefore, negotiation efficiency can be improved.

Optionally, the receiver 1320 may be specifically configured to receive the first MAC frames sent by the some or all of the plurality of STAs based on the trigger information by using at least one of an OFDMA technology and an MU-MIMO technology.

Optionally, the transmitter 1310 may be further configured to send acknowledgment information to the corresponding STA based on the TWT parameter of the STA carried in the first MAC frame, or send the second MAC frame to the corresponding STA based on the instruction information carried in the first MAC frame.

It should be understood that the AP 1300 may be specifically the AP 900 in the foregoing embodiment, and may be configured to perform the steps and/or procedures in the method embodiment shown in FIG. 5. Optionally, the memory 1340 may include a read-only memory and a random access memory, and provide an instruction and data to the processor. Apart of the memory may further include a non-volatile random access memory. For example, the memory may further store device type information. The processor 1330 may be configured to execute the instruction stored in the memory. When the processor executes the instruction stored in the memory, the processor is configured to perform the steps and/or procedures in the method embodiment shown in FIG. 5. For brevity, details are not described herein again.

Figure 15:
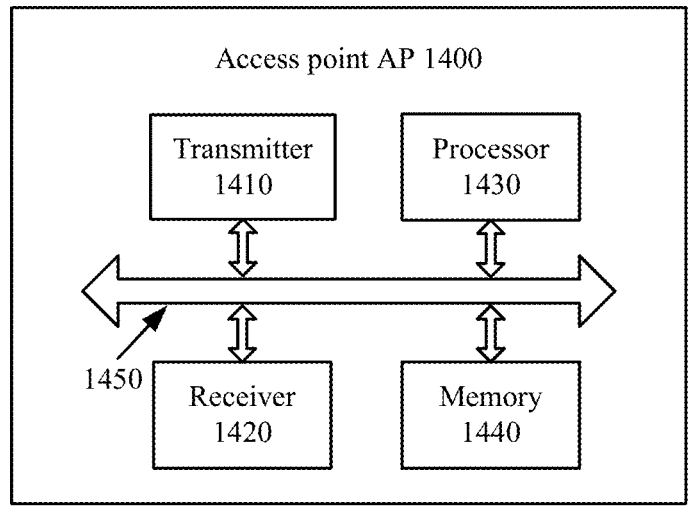
FIG. 15 is a schematic block diagram of an access point AP according to still another embodiment of this application.

FIG. 15 shows an access point (AP) 1400 according to an embodiment of this application. The AP 1400 includes a transmitter 1410, a receiver 1420, a processor 1430, a memory 1440, and a bus system 1450. The transmitter 1410, the receiver 1420, the processor 1430, and the memory 1440 are connected by the bus system 1450. The memory 1440 is configured to store an instruction. The processor 1430 is configured to execute the instruction stored in the memory 1440, to control the transmitter 1410 to send a signal and control the receiver 1420 to receive a signal.

The processor 1430 may generate a first media access control MAC frame, where the first MAC frame carries a plurality of pieces of target wake time TWT information that are corresponding to first STAs in a plurality of STAs in a one-to-one manner.

The transmitter 1410 may send the first MAC frame to the plurality of STAs, where the first MAC frame is used for each of the first STAs to determine a TWT parameter of the STA based on corresponding TWT information.

According to this embodiment of this application, the AP can simultaneously negotiate TWTs with some or all of the plurality of STAs by sending TWT information of the some or all of the plurality of STAs to the plurality of STAs, so that a prior-art disadvantage that an AP can negotiate a TWT parameter with only one STA at a time can be overcome. Therefore, negotiation efficiency can be improved.

Optionally, the processor 1430 may be specifically configured to generate the first MAC frame by aggregating a plurality of MAC frames that are corresponding to the first STAs in a one-to-one manner.

Optionally, the processor 1430 may be specifically configured to generate the first MAC frame by generating a first information element that carries the plurality of pieces of TWT information, where the first information element includes a plurality of first fields and a plurality of second fields, each first field defines a unique identifier ID corresponding to an $i^{th}$ STA in the first STAs, and each second field defines TWT information corresponding to the $i^{th}$ STA.

Optionally, the processor 1430 may be specifically configured to generate the first MAC frame by generating a trigger frame that carries the plurality of pieces of TWT information, where the trigger frame includes a plurality of third fields, fourth fields, and fifth fields, each third field defines a unique identifier ID corresponding to an $i^{th}$ STA in the first STAs, each fourth field defines resource scheduling information corresponding to the $i^{th}$ STA in the first STAs, and each fifth field defines TWT information corresponding to the $i^{th}$ STA in the first STAs.

Optionally, the processor 1430 may be specifically configured to generate the first MAC frame by generating a second information element that carries the plurality of pieces of TWT information, where the second information element includes a plurality of sixth fields, and each sixth field defines TWT information corresponding to an $i^{th}$ STA in the first STAs. The MAC frame further includes a plurality of seventh fields and a plurality of eighth fields, where each seventh field defines a unique identifier ID corresponding to the $i^{th}$ STA in the first STAs, and each eighth field defines resource scheduling information corresponding to the $i^{th}$ STA in the first STAs.

Optionally, an ordinal position of an $i^{th}$ seventh field is corresponding to an ordinal position of a sixth field that is in the second information element and that defines TWT information of a STA corresponding to the $i^{th}$ seventh field.

Optionally, the transmitter 1410 may be further configured to send trigger information to the first STAs, where the trigger information includes resource scheduling information for uplink transmission of each of the first STAs.

Optionally, the TWT information includes a TWT parameter of a corresponding STA. In this case, the receiver 1420 is configured to receive acknowledgment information sent by some or all of the first STAs based on the trigger information when the some or all of the first STAs determine corresponding TWT parameters carried in the first MAC frame.

Optionally, the TWT information includes instruction information for instructing the AP to send the TWT parameter to the corresponding STA. In this case, the receiver 1420 may be configured to receive second MAC frames sent by some or all of the first STAs based on the trigger information and corresponding instruction information that is carried in the first MAC frame, where TWT information carried in the second MAC frame carries a TWT parameter determined by a corresponding STA.

It should be understood that the AP 1400 may be specifically the AP 1000 in the foregoing embodiment, and may be configured to perform the steps and/or procedures in the method embodiment shown in FIG. 7. Optionally, the memory 1440 may include a read-only memory and a random access memory, and provide an instruction and data to the processor. Apart of the memory may further include a non-volatile random access memory. For example, the memory may further store device type information. The processor 1430 may be configured to execute the instruction stored in the memory. When the processor executes the instruction stored in the memory, the processor is configured to perform the steps and/or procedures in the method embodiment shown in FIG. 7. For brevity, details are not described herein again.

Figure 16:
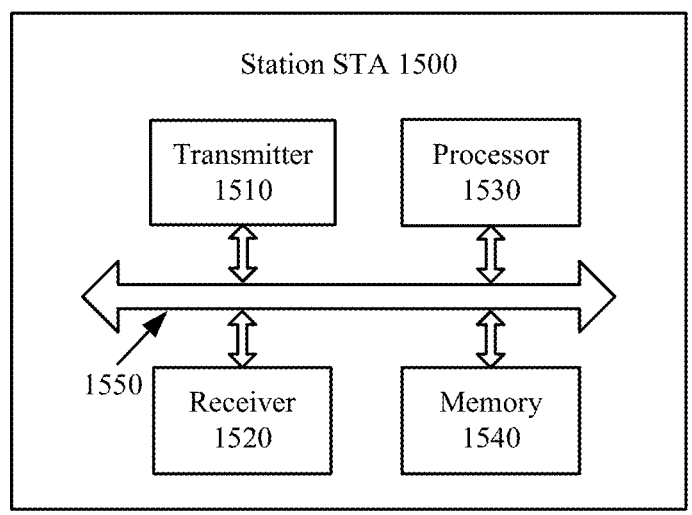
FIG. 16 is a schematic block diagram of a station STA according to an embodiment of this application.

FIG. 16 shows a station (STA) 1500 according to an embodiment of this application. The STA 1500 includes a transmitter 1510, a receiver 1520, a processor 1530, a memory 1540, and a bus system 1550. The transmitter 1510, the receiver 1520, the processor 1530, and the memory 1540 are connected by the bus system 1550. The memory 1540 is configured to store an instruction. The processor 1530 is configured to execute the instruction stored in the memory 1540, to control the transmitter 1510 to send a signal and control the receiver 1520 to receive a signal.

The receiver 1520 may receive trigger information sent by an AP, where the trigger information is used to instruct the STA to send a first media access control MAC frame corresponding to the STA to the AP.

The transmitter 1510 may send the first MAC frame to the AP based on the trigger information, where the first MAC frame carries a target wake time TWT parameter of the STA or instruction information for instructing the AP to send a TWT parameter to the STA, and the TWT parameter is used to negotiate a TWT of the STA.

In this embodiment of this application, a STA in a plurality of STAs may be triggered by the AP to negotiate a TWT with the AP. When the STA negotiates the TWT with the AP, another STA may also be triggered by the AP to negotiate a TWT with the AP. Therefore, negotiation efficiency can be improved.

Optionally, the transmitter 1510 may be specifically configured to send the first MAC frame to the AP based on the trigger information by using at least one of an OFDMA technology and an MU-MIMO technology.

Optionally, the receiver 1520 may be further configured to receive acknowledgment information sent by the AP based on the TWT parameter of the STA carried in the first MAC frame, or receive a second MAC frame that carries the TWT parameter of the STA and that is sent by the AP based on the instruction information carried in the first MAC frame.

It should be understood that the STA 1500 may be specifically the STA 1100 in the foregoing embodiment, and may be configured to perform the procedures and/or steps that are in the methods shown in FIG. 2, FIG. 5, and FIG. 7 and that are corresponding to any one of the STAs, and the procedures and/or steps corresponding to the STA that are in the method shown in FIG. 8. Optionally, the memory 1540 may include a read-only memory and a random access memory, and provide an instruction and data to the processor. A part of the memory may further include a non-volatile random access memory. For example, the memory may further store device type information. The processor 1530 may be configured to execute the instruction stored in the memory, and when the processor executes the instruction stored in the memory, the processor is configured to perform the procedures and/or steps that are in the methods shown in FIG. 2, FIG. 5, and FIG. 7 and that are corresponding to any one of the STAs, and the procedures and/or steps corresponding to the STA that are in the method shown in FIG. 8. For brevity, details are not described herein again.

It should be understood that in the embodiment of this application, the processor may be a central processing unit (CPU), or the processor may be another general-purpose processor, a digital signal processor (DSP), an application-specific integrated circuit (ASIC), a field programmable gate array (FPGA) or other programmable logic device, a discrete gate or transistor logic device, a discrete hardware component, or the like. The general-purpose processor may be a microprocessor, or the processor may be any conventional processor or the like.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor executes an instruction in the memory to complete the steps in the foregoing methods in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, the units and steps in the examples described with reference to the embodiments disclosed herein may be implemented by electronic hardware, computer software, or a combination thereof. To clearly describe the interchangeability between hardware and software, the foregoing has generally described compositions and steps of each example based on functions. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be electrical, mechanical, or other forms of connections.

The units described as separate parts may or may not be physically separate. Parts displayed as units may or may not be physical units, and may be located in one position or distributed on a plurality of network units. Some or all of the units may be selected based on actual needs to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for negotiating a target wake time (TWT), the method comprising:

generating, by an access point (AP), a first media access control (MAC) frame by aggregating a plurality of MAC frames corresponding to first stations (STAs) in a plurality of STAs in a one-to-one manner, wherein the first MAC frame carries a plurality of pieces of TWT information corresponding to the first STAs in a one-to-one manner;

generating, by the AP, the first MAC frame by generating a first information element that carries the plurality of pieces of TWT information, wherein the first information element comprises a plurality of first fields and a plurality of second fields, each first field defines a unique identifier (ID) corresponding to an $i^{th}$ STA in the first STAs, and each second field defines TWT information corresponding to the $i^{th}$ STA and generating a trigger frame that carries the plurality of pieces of TWT information, wherein the trigger frame comprises a plurality of third fields, fourth fields, and fifth fields, each third field defines a unique identifier (ID) corresponding to the $i^{th}$ STA in the first STAs, each fourth field defines resource scheduling information for uplink transmission corresponding to the ith STA in the first STAs, wherein the resource scheduling information for uplink transmission includes a resource block indication, a modulation scheme, and a coding scheme, and each fifth field defines TWT information corresponding to the $i^{th}$ STA in the first STAs, and wherein uplink and downlink transmissions with different first STAs utilize different time and frequency resources; and sending, by the AP, the first MAC frame to the plurality of STAs, the first MAC frame for determining a TWT parameter of each of the first STAs based on corresponding TWT information.

2. The method according to claim 1, further comprising:
sending, by the AP, trigger information to the first STAs, wherein the trigger information comprises resource scheduling information for uplink transmission of each of the first STAs.

3. The method according to claim 1, wherein:
the TWT information comprises a TWT parameter of a corresponding STA; and
the method further comprises:
receiving, by the AP, acknowledgment information sent by some or all of the first STAs based on the trigger information when the some or all of the first STAs determine corresponding TWT parameters carried in the first MAC frame.

4. The method according to claim 1, wherein:
the TWT information comprises instruction information for instructing the AP to send the TWT parameter to the corresponding STA; and
the method further comprises:
receiving, by the AP, second MAC frames sent by some or all of the first STAs based on the trigger information and corresponding instruction information that is carried in the first MAC frame, wherein TWT information carried in the second MAC frame carries a TWT parameter determined by a corresponding STA.

5. An access point (AP), comprising:
a processor configured to:
generate a first media access control (MAC) frame by aggregating a plurality of MAC frames corresponding to first stations (STAs) in a plurality of STAs in a one-to-one manner, wherein the first MAC frame carries a plurality of pieces of target wake time (TWT) information that are corresponding to the first STAs in a one-to-one manner;

generate the first MAC frame by generating a first information element that carries the plurality of pieces of TWT information, wherein the first information element comprises a plurality of first fields and a plurality of second fields, each first field defines a unique identifier (ID) corresponding to an $i^{th}$ STA in the first STAs, and each second field defines TWT information corresponding to the $i^{th}$ STA and generating a trigger frame that carries the plurality of pieces of TWT information, wherein the trigger frame comprises a plurality of third fields, fourth fields, and fifth fields, each third field defines a unique identifier (ID) corresponding to the $i^{th}$ STA in the first STAs, each fourth field defines resource scheduling information for uplink transmission corresponding to the $i^{th}$ STA in the first STAs, wherein the resource scheduling information for uplink transmission includes a resource block indication, a modulation scheme, and a coding scheme, and each fifth field defines TWT information corresponding to the $i^{th}$ STA in the first STAs, and wherein uplink and downlink transmissions with different first STAs utilize different time and frequency resources; and a transmitter configured to send, to the plurality of STAs, the first MAC frame generated by the generation unit, the first MAC frame for determining a TWT parameter of each of the first STAs based on corresponding TWT information.

6. The AP according to claim 5, wherein the transmitter is further configured to:
send trigger information to the first STAs, wherein the trigger information comprises resource scheduling information for uplink transmission of each of the first STAs.

7. The AP according to claim 5, wherein:
the TWT information comprises a TWT parameter of a corresponding STA; and
the AP further comprises:
a receiver configured to receive acknowledgment information sent by some or all of the first STAs based on the trigger information when the some or all of the first STAs determine corresponding TWT parameters carried in the first MAC frame.

8. The AP according to claim 5, wherein:
the TWT information comprises instruction information for instructing the AP to send the TWT parameter to the corresponding STA; and
the AP further comprises:
a receiver configured to receive second MAC frames sent by some or all of the first STAs based on the trigger information and corresponding instruction information that is carried in the first MAC frame, wherein TWT information carried in the second MAC frame carries a TWT parameter determined by a corresponding STA.

* * * * *